United States Patent
Mecocci et al.

(10) Patent No.: US 11,908,304 B1
(45) Date of Patent: Feb. 20, 2024

(54) SYSTEMS AND METHODS FOR MANAGING UNPROCESSED ALARMS IN ALARM SYSTEMS

(71) Applicant: Eurotherm Limited, Telford (GB)

(72) Inventors: Francesco Mecocci, Monterotondo (IT); Stuart Peter Sexton, Billingshurst (GB)

(73) Assignee: Eurotherm Limited, Telford (GB)

( * ) Notice: Subject to any disclaimer, the term of this patent is extended or adjusted under 35 U.S.C. 154(b) by 0 days.

(21) Appl. No.: 17/971,155

(22) Filed: Oct. 21, 2022

(51) Int. Cl.
*G08B 25/00* (2006.01)

(52) U.S. Cl.
CPC .................. *G08B 25/001* (2013.01)

(58) Field of Classification Search
CPC ..................................................... G08B 25/001
See application file for complete search history.

(56) References Cited

U.S. PATENT DOCUMENTS

| | | | | |
|---|---|---|---|---|
| 7,805,125 B2 * | 9/2010 | Belmonte | .......... | H04M 1/72424 370/312 |
| 9,715,820 B1 * | 7/2017 | Boss | ................... | H04L 67/1048 |
| 11,380,186 B1 * | 7/2022 | Neubauer | .......... | G08B 21/0461 |
| 11,580,842 B1 * | 2/2023 | Hauser | ................ | G08B 21/182 |
| 11,763,659 B2 * | 9/2023 | Neubauer | ............ | G08B 21/182 340/573.1 |
| 2015/0379864 A1 * | 12/2015 | Janchookiat | .......... | G06F 11/327 340/506 |
| 2020/0145620 A1 * | 5/2020 | Alcantara | ............... | G06V 20/35 |
| 2022/0075339 A1 * | 3/2022 | Lutz | ..................... | G05B 19/054 |
| 2022/0382260 A1 * | 12/2022 | Lutz | ................. | G05B 19/41865 |
| 2023/0005357 A1 * | 1/2023 | Neubauer | ............... | G16H 20/10 |

* cited by examiner

*Primary Examiner* — Ojiako K Nwugo
(74) *Attorney, Agent, or Firm* — Burris Law, PLLC

(57) ABSTRACT

A method and system are provided for managing an alarm. The method and system can capture occurrences of an alarm for a monitored process; track the occurrences, including whether the occurrences, including a current occurrence of the alarm and a prior occurrence of the alarm, have been acknowledged by a user; and record alarm information for the occurrences of the alarm in a memory. The alarm information can include each occurrence of the alarm and information associated therewith including a timestamp of the occurrence and whether the occurrence of the alarm is acknowledged or not by the user. The method and system can further present or enable presentation of unacknowledged occurrences, from the tracked occurrences, for acknowledgement by a user. The unacknowledged occurrences can include a prior occurrence of the alarm. The recorded alarm information is updated to reflect the acknowledgement of the prior occurrence of the alarm when acknowledged.

25 Claims, 20 Drawing Sheets

1000

Current alarms table (1010)

| Alarm | On | Current State | # Tot Unacked |
|---|---|---|---|
| Abs Hi | 00:10 | Inactive, Unacked | ④ |
| | | | |
| | | | |
| | | | |

Alarm history table (1020)

| Alarm | On | Off | Acked | Comment |
|---|---|---|---|---|
| Abs Hi | 00:01 | 00:02 | | |
| Abs Hi | 00:03 | 00:05 | 00:04 | Cause of current alarms is ... |
| Abs Hi | 00:06 | 00:07 | | |
| Abs Hi | 00:08 | 00:09 | | |
| Abs Hi | 00:10 | 00:11 | | |
| | | | | |

SYSTEMS AND METHODS FOR MANAGING UNPROCESSED ALARMS IN ALARM SYSTEMS

FIELD

The present disclosure is generally directed to a system and method of managing alarms, and more particularly, to a system and method for enabling acknowledgement of unacknowledged/unprocessed occurrences of an alarm.

BACKGROUND

Processing, such as batch processing, is performed in various automation and manufacturing applications in industries, which can include life sciences, chemical, food and beverage, pharmaceuticals, heat-treatment and other industries. In the event of abnormal operating condition, an alarm may be activated to inform an operator of the abnormal condition. Operators, in the context of classical alarm system, deal only with the current occurrences of alarms and are able to acknowledge only the current occurrence. Where an alarm occurrence was superseded without acknowledgement, operators would not be presented by classical alarm systems by any real-time information about the prior unprocessed and unacknowledged alarm occurrences and would not be able to acknowledge those anymore as they would have become historic alarm events.

SUMMARY

In accordance with an embodiment, a method and system are provided for managing an alarm. The method and system can involve: capturing in real-time each new occurrence of an alarm for a monitored process, the alarm being active or inactive based on an alarm criteria and at least process data, including one or more process values, of a monitored process, each new occurrence of the alarm superseding a prior occurrence of the alarm as a current occurrence of the alarm; tracking occurrences of the alarm including whether the occurrences, including the current occurrence of the alarm and at least one prior occurrence of the alarm, have been acknowledged by a user; recording alarm information for the occurrences of the alarm in a memory, the alarm information including each occurrence of the alarm and information associated therewith including a timestamp of the occurrence and whether the occurrence of the alarm is acknowledged or not by the user; presenting or enabling presentation of one or more unacknowledged occurrences, from the tracked occurrences of the alarm, for acknowledgement by a user, the one or more unacknowledged occurrences including the at least one prior occurrence of the alarm; and in response to acknowledgement of the at least one prior occurrence of the alarm, updating the recorded alarm information to reflect the acknowledgement of the at least one prior occurrence of the alarm.

In various embodiments, information related to each new occurrence of the alarm can be provided to a user device to enable presentation of the current occurrence of the alarm and/or the at least one prior occurrence of the alarm for acknowledgement by the user.

In various embodiment, the presenting or enabling presentation operation can comprise: presenting or enabling presentation of the current occurrence of the alarm for acknowledgement by the user, wherein, when a new occurrence of the alarm occurs, the new occurrence of the alarm becomes the current occurrence of the alarm; and in response to acknowledgement of the current occurrence of the alarm, updating the recorded alarm information to reflect the acknowledgement of the current occurrence of the alarm.

In various embodiments, the presenting or enabling presentation operation can comprise: presenting or enabling presentation of information in real-time for the current occurrence of the alarm and a total number of unacknowledged occurrences of the alarm; and in response to a user input, presenting or enabling presentation of the one or more unacknowledged occurrences of the alarm on a graphical user interface with a first graphical element (e.g. graphical window) for enabling a user to selectively acknowledge the presented one or more unacknowledged occurrences. Furthermore, the graphical user interface can be configured to receive comments from the user, the recorded alarm information being updated with the comments. The alarm information also can be recorded in an alarm history table, and the graphical user interface includes a graphical input for linking to the alarm history table to present a filtered view of occurrences on the alarm history table on a second graphical element (e.g. graphical window) through which to selectively acknowledge an unacknowledged occurrence of the alarm from the occurrences of the alarm recorded on the alarm history table.

In various embodiments, the tracking occurrences of the alarm operation comprises tracking in real-time a first number of unacknowledged prior occurrences of the alarm or a second number of a total number of unacknowledged occurrences.

In various embodiments, the method and system can further involve: receiving the process data in real-time; activating or de-activating the alarm in real-time based on the alarm criteria and the received process data; and recording the process data along with or in association with the alarm information.

In various embodiments, the presentation or acknowledgement of the unacknowledged prior occurrences can be constrained by a time or quantity constraint.

In various embodiments, the method and system can further involve: performing statistical analysis for the occurrences of the alarm over the course of the running process; and recording statistical information from the statistical analysis for the occurrences of the alarm in the memory.

In various embodiments, the capturing operation, the tracking operation, the recording operation, the presenting or enabling presentation operation, and the updating operation can be performed for a plurality of different alarms.

In various embodiments, at least the capturing operation, the tracking operation, the recording operation, and the updating operation are performed by a process data recorder/controller responsible for capturing and storing the process data in real-time.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

DISCUSSION OF EXAMPLE EMBODIMENTS

Figure 1:
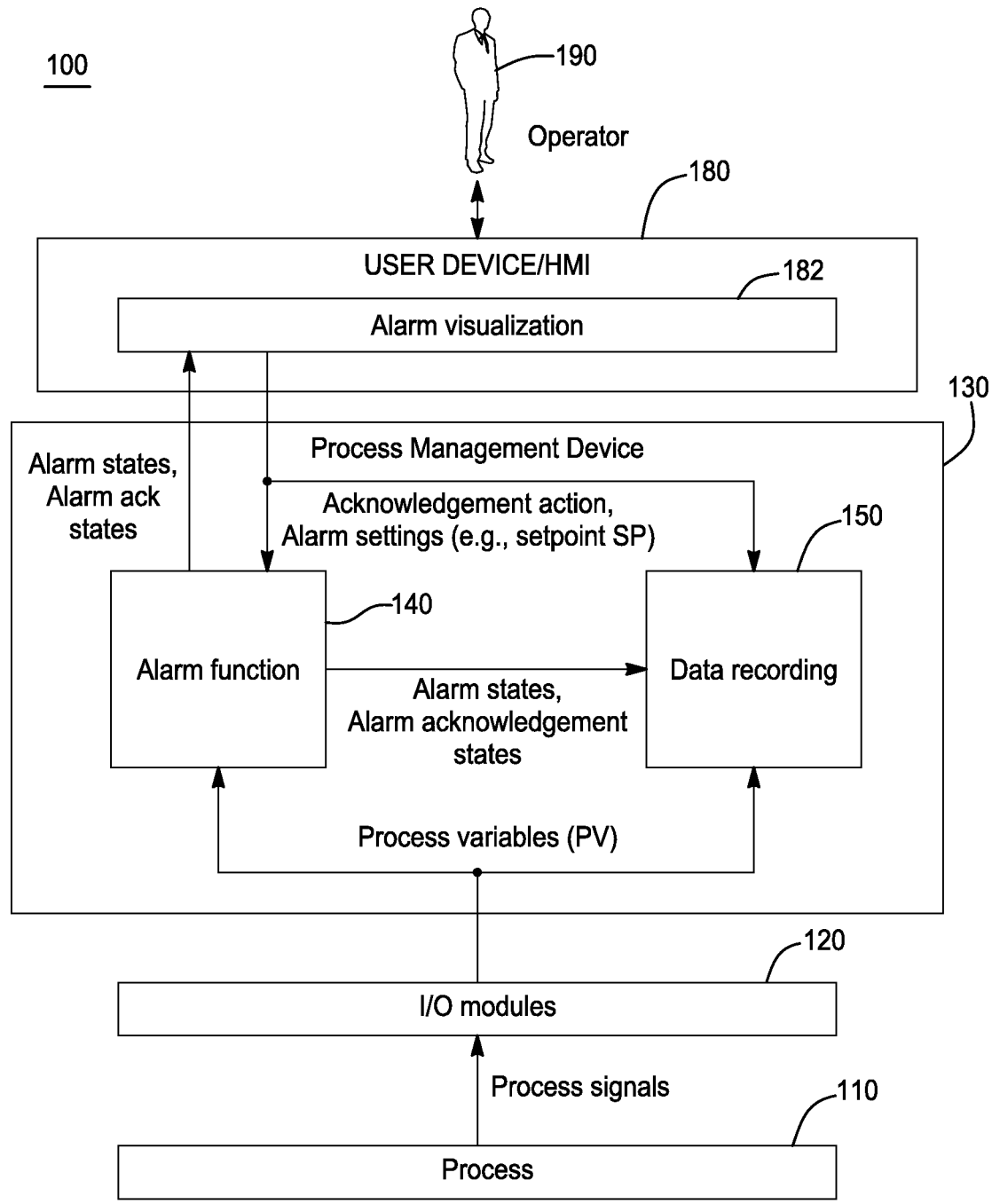
FIG. 1 is a block diagram of a system architecture for managing alarms, including current and prior occurrences of an alarm(s) related to a monitored process(es), in accordance with an embodiment.

In accordance with an embodiment, a method and system are provided for managing one or more alarms related to a monitored process, such as for example an industrial process. The method and system can facilitate the capture, tracking and acknowledgement of occurrences (also referred to as "instances") of an alarm(s), including unprocessed current and prior occurrence of the alarm(s). The method and system can hence improve the data integrity (i.e. data completeness) of the process records of a process management device (e.g. process controller and recorder), by recording additional information, notes and actions of operators on previous "unprocessed" and unacknowledged alarms. As used herein, an "unprocessed" occurrence of an alarm is also referred to as an "unacknowledged" occurrence of an alarm.

For example, the method and system can incorporate functionality, which can track unprocessed occurrence of an alarm, including current and prior unprocessed occurrences of the alarm, and allow a user such as an operator to see and "historically acknowledge" unprocessed past (or prior) occurrences of the alarm which were not acknowledged and then were superseded by a new occurrence of the same alarm. Such functionality can be distinct from the acknowledgement function of the current state of an alarm (although it could be presented to the user using the same terminology "acknowledgement"). The method and system can implement such functionality, in combination with the real-time secure recording of the process data in a storage/memory by a process data recorder or process controller (referred herein as process data recorder/controller) and offer this functionality to operators who are working on live processes.

In various embodiments, the acknowledgement of a currently active alarm instance can happen only once; however, the functionality can provide for the indication to the user, during operation, of unprocessed historical alarms (e.g., unacknowledged prior occurrences of an alarm).

In various embodiments, the functionality can be constrained, for example, by a predefined limit on the maximum number of unprocessed historical alarms and/or the predefined longest period of observation and retention of unprocessed alarms.

Accordingly, the method and system can provide various improvements or benefits, such as for example:
  improve the data integrity (i.e. data completeness) of process records of regulated processes, where all the process events are meant to be recorded. In current alarm and recording systems, unprocessed alarms remain in history, but the operator action of acknowledging them is not available.
  allow operators to immediately see unprocessed alarms in the user device such as a human machine interface (HMI), rather than force them to find historic alarms in the data log.
  allow operators to immediately move from an operator/monitoring HMI screens (e.g. summary table of current alarms) to the historic alarms and events view (e.g. table of historic alarms) pre-filtered to show only the specific alarm occurrences.
  enable evaluation of statistics of operator alarm-response effectiveness (e.g., the least unprocessed alarms, the best reaction time from operators, etc.).

These and other examples of the alarm management method and system of the present disclosure will be described in greater detail below with reference to the figures.

FIG. 1 is a block diagram of an example system architecture 100 for managing alarms, including unprocessed current and prior occurrences of one or more alarms, related to a one or more monitored processes, in accordance with an embodiment. The system architecture 100 can include a process 110, input/output (I/O) modules 120, process management (PM, e.g. a process data recorder/controller) device 130 and a user device 180. In this example, the user device 180 can be a human machine interface (HMI), which can be associated with or dedicated to the PM device 130. The various components or equipment can be communicatively connected to interact with each other over wireline and/or wireless communication.

The process 110 can be a process, such as an industrial process, which may be implemented in a plant area. The process 110 can be a batch or non-batch process(es), such as for example an automation or manufacturing process or sub-process thereof, which may be related to chemical, life sciences, food and beverage, heat treatment or other industry. In various embodiments, the process 110 can be a process for a regulated industry, such as pharmaceutical or heat treatment, or any application which may require secure (e.g., tamper-resistant, etc.) storage of process data or other related data of a process for review, validation and recordkeeping. In various embodiments, the process 110 can be implemented under control of a control system, which can, for example, be a programmable logic controller (PLC) in a SCADA (supervisory control and data acquisition) system for an industrial or other process which may be automated.

The control system can employ a plurality of sensors (e.g., field devices) in the plant area to sense, detect or measure operating parameter(s)/variable(s) of the process 110 to obtain, derive, calculate or determine one or more process value(s) for the process 110, which in turn may be used by the control system to control or facilitate control of the process 110. Depending on the process application, a process value can, for example, include but is not limited to temperature, pressure or other process variable/parameter or combinations thereof. As used herein, the term "process value" is also referred to as "process variable" or PV.

The I/O modules 120 can be configured to receive data, such as process signals, from the process 110 or equipment associated therewith. For example, the process signals may include one or more process values for the monitored process, which can be monitored using field devices such as sensors/meters, field computers, and other monitoring devices. The I/O modules 120 can process or manage communication to the PM device 130 from other devices (e.g., field devices, data servers, etc.) and from the PM device 130 to other devices.

The PM device 130 can be a computer device (or system, or embedded device), which is configured to implement various functions, operations, processes or modules associated with the management of an alarm(s) and alarm information (or data) associated therewith, and the collection and storage of process data, alarm information, and/or other data for the process 110 being monitored. These functions, operations, processes or modules can include, but are not limited to alarm function 140 and data recording 150. In various embodiments, the PM device 130 can be a process data recorder or process controller (process data recorder/controller), or a PLC such as the PLC of the control system for the process 110. The PM device 130 can be located at the point of measurement or monitoring of the process value(s) of the process data.

The alarm function 140 can facilitate acknowledgement of current and prior unacknowledged occurrences of an alarm(s). For example, the alarm function 140 can be configured to receive in real-time process data, such as process value(s); to generate an occurrence(s) of an alarm (e.g., activate or turn ON an alarm) based on the process data and alarm criteria (e.g., alarm setting(s), threshold(s) or condition(s) such as for example a setpoint SP, etc.); to capture each new occurrence of the alarm(s); to communicate each new occurrence of the alarm(s) to the user device 180 and other information (e.g., alarm states, alarm acknowledgement states, etc.); to track each occurrence of the alarm(s) including a time of occurrence and whether each occurrence of the alarm(s) is acknowledged or not by a user (including updating such information in real-time); to communicate information relating to at least one prior occurrence of the alarm(s) which has not been acknowledged; to receive acknowledgement information for one or more occurrences of the alarm(s) (e.g., acknowledgement action related to a current occurrence of the alarm, a selected prior occurrence(s) of the alarm, all unacknowledged occurrences of the alarm, etc.) or other information (e.g., alarm criteria such as alarm settings (e.g., setpoint SP), etc.); to enable acknowledgement of current unacknowledged occurrence of the alarm(s) and/or prior unacknowledged occurrence(s) of the alarm(s); and to implement other functions or operations described herein.

The data recording 150 can be configured to store in a memory various information related to the process 110, including but not limited, for example, to alarm information (e.g., each occurrence of the alarm(s), time stamp for each occurrence of the alarm(s) and any user information inputted for each occurrence of the alarm(s) including acknowledgement/non-acknowledgement of an occurrence of the alarm, and any notes, comments or designation by the user for the occurrence of the alarm), process data (e.g., process values (PVs) and time stamp), and other information related to the process 110; and to implement other functions or operations described herein. For example, as shown in FIG. 1, the data recording 150 can receive information such as alarm states reflecting each new occurrence of the alarm(s), alarm acknowledgement states and acknowledgement action(s) including any other user input related to occurrences of the alarm(s). In various embodiments, the alarm information may be recorded in an alarm log, which can be linked to the stored process data. The alarm log may store an alarm historical table containing alarm information for each of the occurrences of the alarm(s). In various embodiments, the alarm history table may be accessed by the user, via the user device 180, through a link (e.g., hyperlink, etc.).

The various stored information can be uploaded to a data server for access and use thereof to perform off-line review, such as on a desktop workstation or other computer device or system. In various embodiments, the data is stored by the data recording 150 in a secure manner to prevent data tampering or any subsequent modification of the stored data and ensure data integrity. For example, the data records can be stored in a tamper resistant file format such as, for example, binary check summed files, or other secure data or file format.

The user device 180 can be a computer device (or system), which is configured to implement various functions, operations, processes or modules associated with: the receipt of information from the PM device 130 related to occurrences of an alarm(s); the presentation of various information related to the process 110 (including occurrences of an alarm(s)) to a user such as the operator 190; the receipt of user input from the user for alarm management (including acknowledging alarm occurrences and configuring alarm criteria (e.g., alarm settings, etc.)) and control of the operation of the process 110; the transmission of information from the user device related to alarm information for occurrences of the alarm(s) including acknowledgement of current and/or prior occurrences of the alarm(s); and other operations associated with the process 101 as discussed herein. In various embodiments, the user device 180 can be a touch-screen HMI, which is operable by a user such as the operator 190. The user device 180 can be associated with the PM device 130 (e.g., dedicated to data recorder or controller, etc.) and connected to the PM device 130 directly or via a network, such as a local area network. The user device 180 can be communicatively connected to the control system for the process 110 to facilitate control by the operator 190 of the process 110.

The user device 180 can implement a function such as alarm visualization 182, which is configured, among other things, to receive information related to an alarm(s), such as a state of the alarm(s) (e.g., active/ON/occurring or inactive/OFF/not occurring) and an acknowledgement state of occurrences of the alarm(s) such as for a new or current occurrence of the alarm(s) and prior unacknowledged occurrence(s) of the alarm(s), and to present such information to the user via an output device. In various embodiments, each new occurrence of the alarm(s) supersedes a prior unacknowledged occurrence of the alarm(s) as the "current" occurrence of the alarm(s), and is presented to a user for acknowledgement as the "current" occurrence of the alarm(s). Furthermore, a prior unacknowledged occurrence(s) of the alarm(s) can be presented for acknowledgement by the user upon a triggering event, e.g., upon a user request or action, upon a new occurrence of the alarm(s) or some other triggering event. The new and prior unacknowledged occurrences of the alarm(s) can be presented, separately or together, through one or more graphical user interfaces (GUIs) such as in a graphical window(s), list(s), table(s) or other format or combination thereof.

The alarm visualization 182 also can be configured to receive user input, including selection of an occurrence of the alarm(s), acknowledgement action of the selected occurrence of the alarm(s) and comments, notes, designation and so forth by the user for the selected occurrence of the alarm(s). The comments, notes or designation may reflect a cause or severity of the occurrence of the alarm(s) or other relevant information associated therewith. The alarm visualization 182 also can be configured to communicate the user input from the user device 180 to the PM device 130 and other devices (if desired).

Accordingly, a user, such the operator 190, can utilize the user device 180 to view information concerning the operation of the process 110, to control operation of the process 20, to configure the alarm criteria for one or more alarms (e.g., alarm settings, etc.), and to take action related to the occurrence of the alarm(s) including but not limited to an acknowledgement action of an occurrence of an alarm (e.g., new occurrence and/or prior unacknowledged occurrence(s)) and other user input for an acknowledged occurrence of the alarm (e.g., inputting comments, notes or designation). The alarm settings can include criteria for one or more alarm-types (e.g., setpoint SP, threshold, condition, or tolerance for one or more monitored process values PV) as well as limitations (or constraints) as to the presentation and the ability to acknowledge prior occurrence(s) of the alarm(s). Such limitations can, for example, include a time limitation, e.g., any prior unacknowledged occurrence(s) of an alarm before a predefined time period from the on-set of a new occurrence of the alarm is not presented to the user or cannot be acknowledged. The limitations also can include a number/quantity limitation, e.g., the number of prior unacknowledged occurrences of an alarm after the on-set of a new occurrence of the alarm, which can be presented or acknowledged, can be limited to a predefined number or quantity of the most recent prior unacknowledged occurrences of the alarm.

It should be understood that the system architecture 100 in FIG. 1 is provided simply as a non-limiting example. In various embodiments, instead of a single PM device 130, the system architecture can include a plurality of PM devices 130 for recording and validating a plurality of process batches being implemented sequentially or in parallel in one or more areas of a plant, and a plurality of user devices 180 (e.g., HMIs) associated with one or more PM devices 130. Furthermore, the system architecture can include one or more PM devices to manage alarm acknowledgement for one or more alarms (e.g., one or more difference alarm types).

While alarm management is shown as being implemented on a PM device 130, e.g., a process data recorder/controller, which can be responsible for acquiring and recording the process data, it is understood that the one or more of the functions and operations of the alarm management described herein can be offloaded and implemented on other computer device(s) or system(s) in a system architecture, including but not limited to the user device, an edge device/cloud, a data server and so forth. Accordingly, in other embodiments, the functions and operations described herein for alarm management also can be implemented in a distributed fashion across a plurality of computer devices and/or systems.

Figure 2:
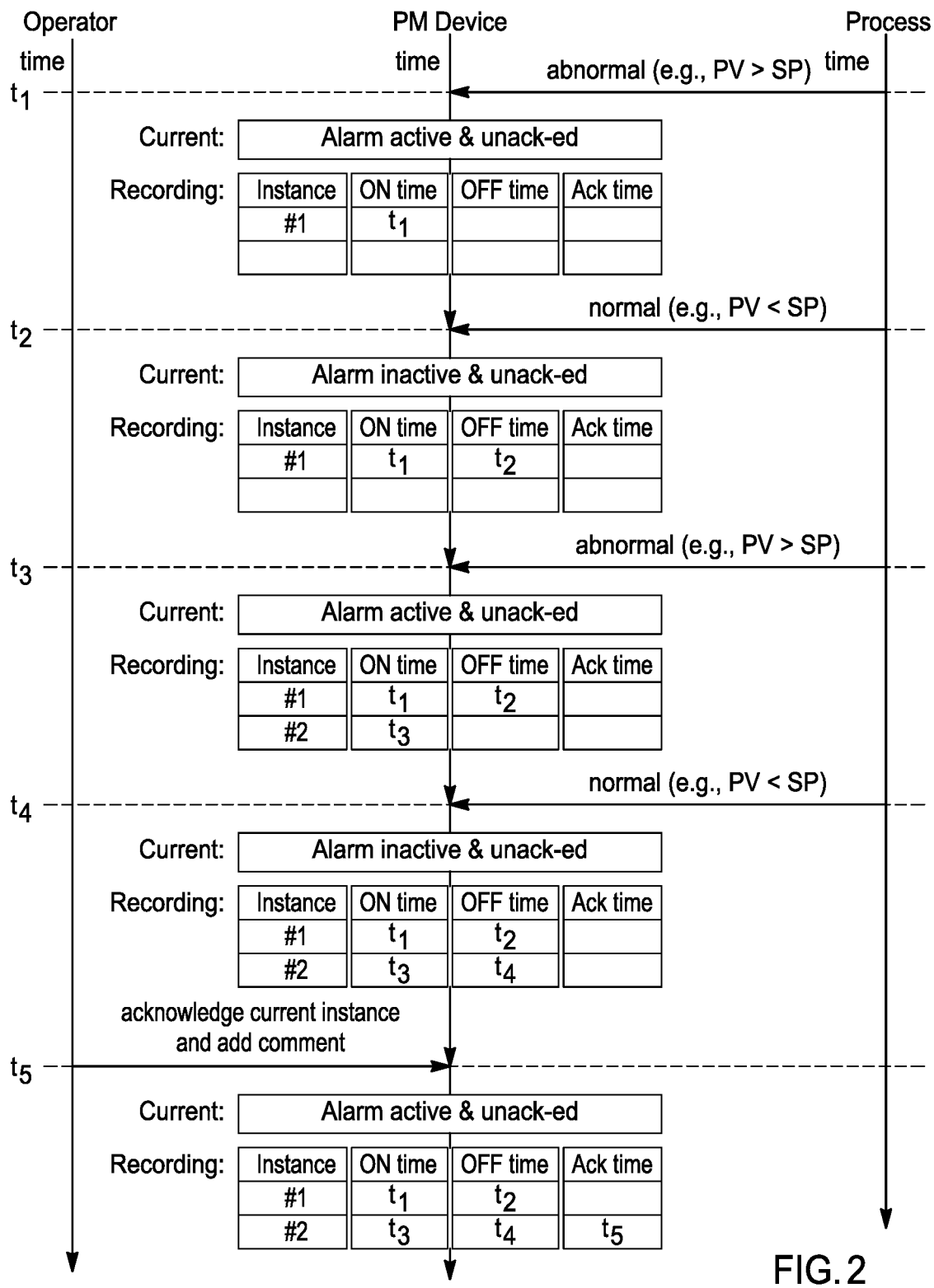
FIG. 2 illustrates a sequence diagram of an example implementation for acknowledging a current occurrence (or instance) of an alarm, in accordance with an embodiment of the present disclosure.

FIG. 2 illustrates a sequence diagram 200 of an example implementation for acknowledging a new or current occurrence (or instance) of an alarm, in accordance with an embodiment of the present disclosure. In this example, the example implementation will be described with reference to the process (e.g., 110), the PM device (e.g., 130) and the operator (e.g., 190) operating a user device (e.g., 180).

As shown in FIG. 2, at time $t_1$, the PM device receives process signals (e.g., process value(s)) indicating an abnormal state. For example, the PM device determines an abnormal state when the process value satisfies an alarm criteria (e.g., PV>setpoint (SP) for the PV), and generates an alarm by activating the alarm. As shown, the PM device can capture and track the current alarm state/alarm acknowledgement state of the current occurrence of the alarm, in this case, Alarm Active and Unacknowledged. The PM device also can record alarm information reflecting the new occurrence of the alarm (e.g., #1) and the ON time of the alarm (e.g., time stamp t1) in a memory. The alarm information can be recorded in a record such as an alarm log in the memory. The PM device can communicate the current occurrence of the alarm, e.g., #1, to the user device for presentation to the operator for acknowledgement.

At time t2, the process signals (e.g., process value(s)) have returned to a normal state. For example, the PM device receives the process signals indicating a normal state, determines a return to the normal state (e.g., PV<SP or PV=SP) according to the alarm criteria, and deactivates the alarm. As shown, the PM device tracks the current alarm state/alarm acknowledgement state for the current occurrence of the alarm, which reflects Alarm inactive and Unacknowledged. The PM device updates the recorded alarm information to reflect the OFF time of the occurrence of the alarm, e.g., #1, as time stamp t2. The PM device can continue to communicate the current occurrence of the alarm #1, which is unacknowledged, to the user device for presentation to the operator.

At time t3, the PM device receives process signals (e.g., process value(s)) indicating an abnormal state. For example, the PM device determines an abnormal state when the process value satisfies an alarm criteria (e.g., PV>setpoint (SP) for the PV), and generates an alarm by re-activating the alarm. As shown, the PM device captures and tracks the current alarm state/alarm acknowledgement state for the current occurrence of the alarm (e.g., #2) which reflects Alarm active and Unacknowledged. The PM device can record the updated alarm information reflecting the new occurrence of the alarm (e.g., #2) and the ON time of the alarm (e.g., time stamp t3). The PM device can communicate the new or current occurrence of the alarm, e.g., #2, to the user device for presentation to the operator. In this example, the new occurrence of the alarm, e.g., #2, can supersede the prior occurrence of the alarm, e.g., #1, as the "current" occurrence of the alarm to be presented to the user for acknowledgement.

At time t4, the process signals (e.g., process value(s)) have returned to a normal state. For example, the PM device receives the process signals indicating a normal state, determines a return to the normal state (e.g., PV<SP or PV=SP) according to the alarm criteria, and deactivates the alarm. As shown, the PM device tracks the current alarm state/alarm acknowledgement state for the current occurrence of the alarm (#2), which reflects Alarm inactive and Unacknowledged. The PM device updates the recorded alarm information to reflect the OFF time of the current occurrence of the alarm, e.g., #2, as time stamp t4. The PM device can continue to communicate the current occurrence of the alarm, e.g., #2, which is unacknowledged, to the user device for presentation to the operator.

At time $t_5$, the operator through the user device acknowledges the current occurrence of the alarm, e.g., #2, and adds comments. The acknowledgement action and comments are communicated to the PM device. The PM device receives the acknowledgement action and comments from the user, and updates the recorded alarm information to reflect the acknowledgement of the occurrence of the alarm, e.g., #2, and the time of acknowledgement at time stamp $t_5$. The PM device also records the user comments for the occurrence of the alarm, e.g., #2. The user input (e.g., comments, etc.) can be stored together or in association with the other alarm information in the alarm log. The alarm management process can continue until the monitored process is terminated.

Figure 3:
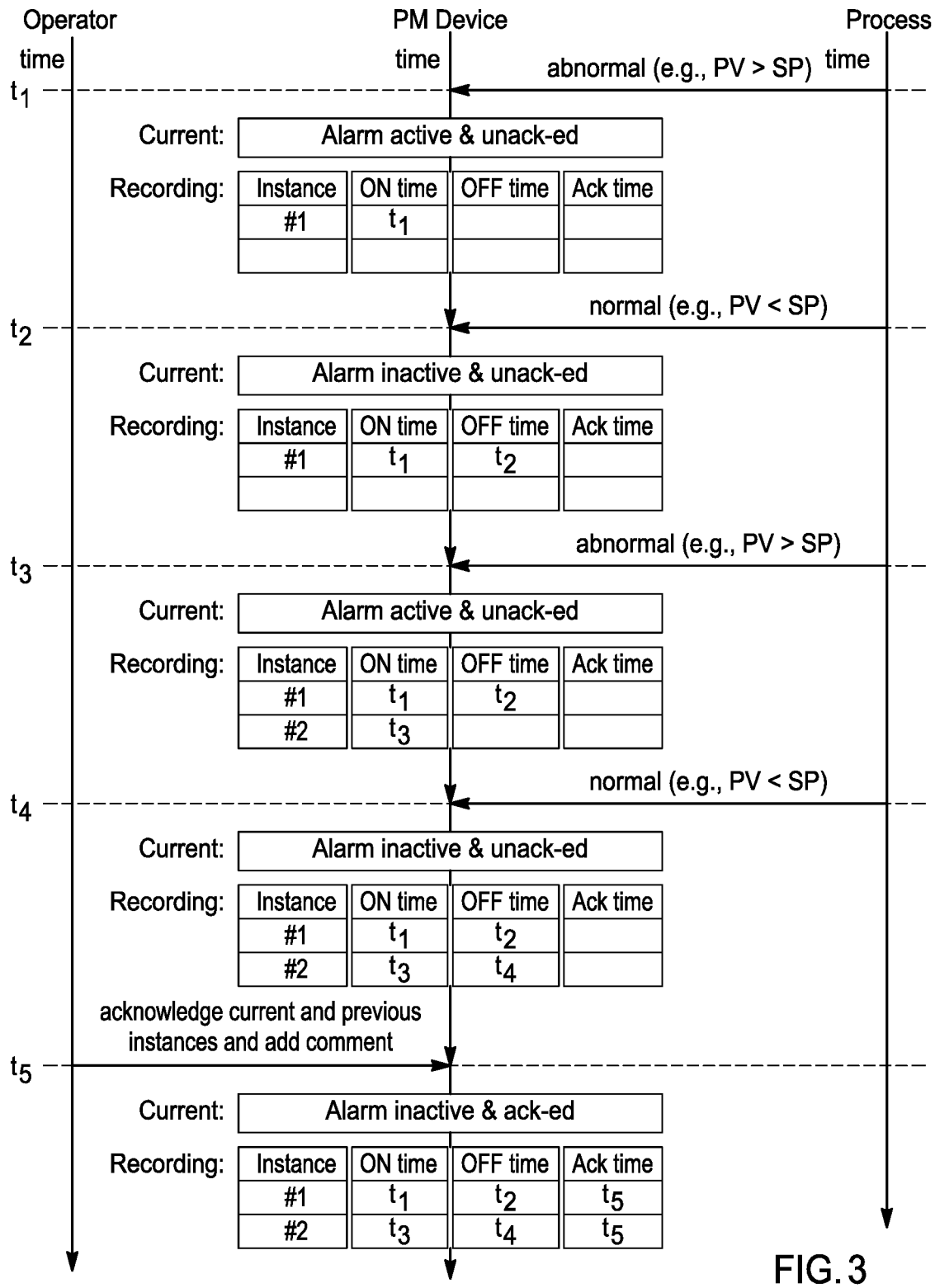
FIG. 3 illustrates a sequence diagram of an example implementation for acknowledging current and prior unprocessed occurrence(s) of an alarm, in accordance with an embodiment of the present disclosure.

FIG. 3 illustrates a sequence diagram 300 of an example implementation for acknowledging current and prior unprocessed occurrence(s) of an alarm, in accordance with an embodiment of the present disclosure. In this example, the example implementation will be described with reference to the process (e.g., 110), the PM device (e.g., 130) and the operator (e.g., 190) operating a user device (e.g., 180), and enables the acknowledgement of prior unacknowledged occurrence(s) of the alarm.

For example, as shown in FIG. 3, at time $t_1$, the PM device receives process signals (e.g., process value(s)) indicating an abnormal state. For example, the PM device can determine an abnormal state when the process value satisfies an alarm criteria (e.g., PV>setpoint (SP) for the PV), and generate an alarm by activating the alarm. As shown, the PM device can capture the new occurrence of the alarm, and can track the current alarm state/alarm acknowledgement state of the current occurrence of the alarm, in this case, Alarm active and Unacknowledged. The PM device also can record alarm information reflecting the new occurrence of the alarm (e.g., #1) and the ON time of the alarm (e.g., time stamp $t_1$) in a memory. The alarm information can be recorded in a record such as an alarm log in the memory. The PM device can communicate the occurrence of the alarm, e.g., #1, to the user device for presentation to the operator for acknowledgement.

At time $t_2$, the process signals (e.g., process value(s)) have returned to a normal state. For example, the PM device receives the process signals indicating a normal state, determines a return to the normal state (e.g., PV<SP or PV=SP) according to the alarm criteria, and deactivates the alarm. As shown, the PM device continues to track the current alarm state/alarm acknowledgement state for the current occurrence of the alarm, which reflects Alarm inactive and Unacknowledged. The PM device updates the recorded alarm information to reflect the OFF time of the occurrence of the alarm, e.g., #1, as time stamp $t_2$. The PM device can communicate the occurrence(s) of the alarm, e.g., #1, which is unacknowledged, to the user device for presentation to the operator.

At time $t_3$, the PM device receives process signals (e.g., process value(s)) indicating an abnormal state. For example, the PM device determines an abnormal state when the process value satisfies an alarm criteria (e.g., PV>setpoint (SP) for the PV), and generates an alarm by re-activating the alarm. As shown, the PM device captures the new occurrence of the alarm (e.g., #2) and tracks the current alarm state/alarm acknowledgement state for the current occurrence of the alarm (e.g., #2) which reflects Alarm active and Unacknowledged. The PM device can record the updated alarm information reflecting the new occurrence of the alarm (e.g., #2) and the ON time of the alarm (e.g., time stamp $t_3$). The PM device can communicate the new or current occurrence of the alarm, e.g., #2, to the user device for presentation to the operator, and also can communicate a prior unacknowledged/unprocessed occurrence of the alarm, e.g., #1, or information associated therewith to the user device for presentation to the operator. In this example, the new occurrence of the alarm, e.g., #2, can supersede the prior occurrence of the alarm, e.g., #1, as the "current" occurrence of the alarm, for presentation to the user for acknowledgement.

At time $t_4$, the process signals (e.g., process value(s)) have returned to a normal state. For example, the PM device receives the process signals indicating a normal state, determines a return to the normal state (e.g., PV<SP or PV=SP) according to the alarm criteria, and deactivates the alarm. As shown, the PM device continues to track the current alarm state/alarm acknowledgement state for the current occurrence of the alarm (e.g., #2), which reflects Alarm inactive and Unacknowledged. The PM device updates the recorded alarm information to reflect the OFF time of the current occurrence of the alarm, e.g., #2, as time stamp $t_4$. The PM device can continue to communicate the current occurrence of the alarm, e.g., #2, which is unacknowledged, to the user device for presentation to the operator. In various embodiments, the prior unacknowledged/unprocessed occurrence of the alarm (or information associated therewith) may also be communicated to the user device together with the current unacknowledged occurrence of the alarm (or information associated therewith), or separately. The current and prior unacknowledged occurrence of the alarm may be presented together or separately to the user for acknowledgement.

At time $t_5$, the operator through the user device can acknowledge the current and prior unacknowledged occurrences of the alarm, e.g., #2 and #1 respectively, and add comments for the occurrences. The acknowledgement action and comments are communicated to the PM device. The PM device receives the acknowledgement action and comments from the user, and updates the recorded alarm information to reflect the acknowledgement of the current and prior occurrences of the alarm, e.g., #2 and #1 respectively, at the acknowledgement time of time stamp $t_5$. The PM device also records the user comments for the occurrences of the alarm, e.g., #2 and #1. The user input (e.g., comments, etc.) can be stored together or in association with the other alarm information in the alarm log. The current alarm state/alarm acknowledgement state is updated to Alarm inactive and Acknowledged. The alarm management process can continue until the monitored process is terminated.

Figure 4:
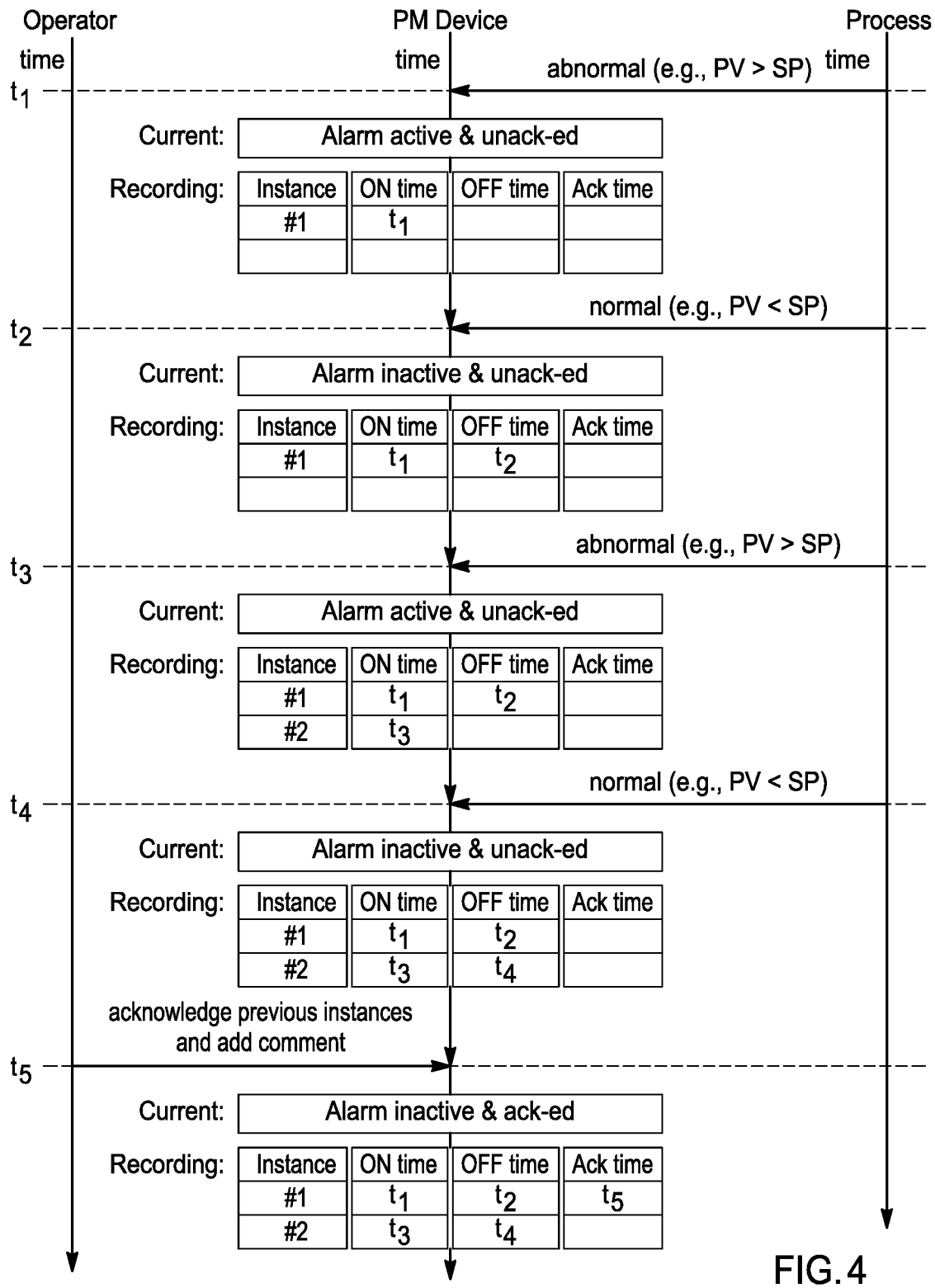
FIG. 4 illustrates a sequence diagram of an example implementation for acknowledging an unprocessed instance of an alarm, in accordance with an embodiment of the present disclosure.

FIG. 4 illustrates a sequence diagram 400 of an example implementation for acknowledging an unprocessed instance of an alarm, in accordance with an embodiment of the present disclosure. In this example, the example implementation will be described with reference to the process (e.g., 110), the PM device (e.g., 130) and the operator (e.g., 190) operating a user device (e.g., 180), and enables the acknowledgement of prior unacknowledged occurrence(s) of the alarm. The example of FIG. 4 is basically the same as the example in FIG. 3 for times $t_1$ through $t_4$, (described above) except for time $t_5$ where the operator in the example of FIG. 4 selectively acknowledges the prior unacknowledged occurrence of the alarm, e.g., #1.

As shown in FIG. 4, at time $t_5$, the operator through the user device acknowledges the prior occurrence of the alarm, e.g., #1, and adds comment for the occurrence. The acknowledgement action and comments are communicated to the PM device. The PM device receives the acknowledgement action and comments from the user, and updates the recorded alarm information to reflect the acknowledgement of the prior unacknowledged occurrence of the alarm, e.g., #1, at the acknowledgement time of time stamp $t_5$. The PM device also records the user comments for the occurrence of the alarm, e.g., #1. The user input (e.g., comments, etc.) can be stored together or in association with the other alarm information in the alarm log. The current alarm state/alarm acknowledgement state remains Alarm inactive and Unacknowledged. The alarm management process can continue until the monitored process is terminated.

Figure 5:
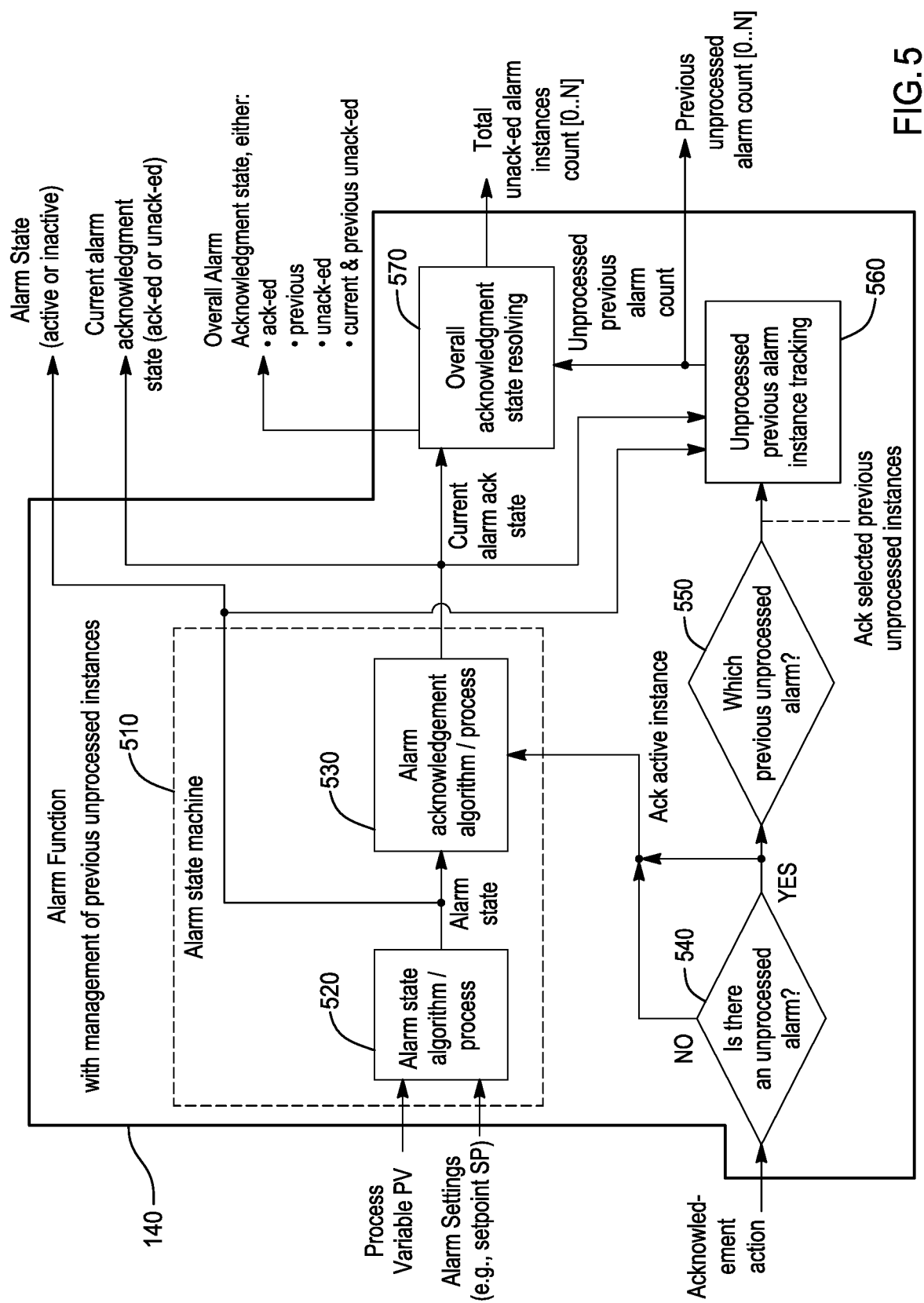
FIG. 5 illustrates an example functional block diagram of an alarm function for managing current and unprocessed instances of an alarm, in accordance with an embodiment of the present disclosure.

FIG. 5 illustrates an example functional block diagram of an alarm function, such as for example 140 in FIG. 1, implemented by a PM device (e.g., 130) for managing unprocessed current and prior occurrences of an alarm, in accordance with an embodiment of the present disclosure.

The alarm function 140 can include an alarm state machine 510, which implements an alarm state algorithm/process 520 and an alarm acknowledgement algorithm/process 530. The alarm state algorithm/process 520 can generate a state of the alarm (Alarm state) based on process data (e.g., process value PV)) and alarm criteria/settings (e.g., setpoint SP). For example, the alarm state algorithm/process can activate or de-activate the alarm when the monitored process data satisfies alarm criteria. When the alarm is activated, the current alarm state is active. When the alarm is de-activated, the current alarm state is inactive.

The alarm acknowledgement algorithm/process 530 can output a current alarm acknowledgement state for a current occurrence of the alarm. For example, the alarm acknowledgement algorithm/process 530 can output a current acknowledged or unacknowledged state based on whether acknowledgement action for the current occurrence of the alarm (or information associated therewith) has been received from the user, such as via the user device. For example, if an acknowledgement of the current occurrence of the alarm is received, the current alarm acknowledgement state is acknowledged; and if an acknowledgement of the current occurrence of the alarm is not received, the current alarm acknowledgement state is unacknowledged. For example, as further shown in FIG. 5, at function block 540, the alarm function 140 can receive an acknowledgement action from the user via the user device, and determine if there is any unacknowledged/unprocessed occurrence of the alarm. If there are no unacknowledged occurrences of the alarm, then the current occurrence of the alarm has already been acknowledged. If there are unacknowledged occurrences of the alarm, then the current occurrence of the alarm is processed as being acknowledged (e.g., recording acknowledgement and time of the acknowledgement) if such acknowledgement is reflected in the received acknowledgement action and the alarm acknowledgement algorithm/process 530 is informed of the acknowledgement. At function block 550, the alarm function 140 determines which selected prior unacknowledged occurrences of the alarm, if any, are acknowledged in view of the received acknowledgement action, and processes the selected occurrences of the alarm as being acknowledged (e.g., recording acknowledgement and time of the acknowledgement information for the selected occurrences).

The alarm function 140 also includes a function block for unprocessed previous alarm instance tracking 560 for tracking prior unacknowledged/unprocessed occurrence(s) of the alarm (also referred to as "function block 560"). For example, the function block 560 can track and maintain an updated count of the unacknowledged/unprocessed prior occurrences of the alarm. In this example, the function block 560 can be configured to output a count of unacknowledged prior occurrences of the alarm (e.g., previous unprocessed alarm count [0 . . . N] where N is an integer) based on the alarm state, the current alarm acknowledgement state and any acknowledgement of prior unacknowledged/unprocessed occurrences of the alarm. In various embodiments, the count can be further adjusted according to predefined presentation/acknowledgement limitations (e.g., a time constraint for limiting those unacknowledged occurrences which can be acknowledged by a time period/frame such as for example before the onset of the most recent occurrence of the alarm; a quantity constraint for limiting those unacknowledged occurrences which can be acknowledged by a quantity or number such as for example before the most recent occurrence of the alarm; and other constraints or a combination thereof which may be application dependent).

The alarm function 140 also can include a function block of overall acknowledgment state resolving 570 (also referred to as "function block 570"). The function block 570 receives the current acknowledgement state from the alarm acknowledgement algorithm/process 530 and the unacknowledged prior alarm count from the unprocessed alarm instance tracking block 560, and outputs Overall Alarm Acknowledgment state. In this example, the Overall Alarm Acknowledgement state can be either: (1) acknowledged (e.g., the current occurrence of the alarm is acknowledged), (2) prior/previous unacknowledged (e.g., one or more prior occurrences of the alarm are unacknowledged), (3) unacknowledged (e.g., the current occurrence of the alarm is unacknowledged) or (4) current & previous unacknowledged (e.g., the current occurrence of the alarm and one or more prior occurrences of the alarm are unacknowledged). The function block 570 also can output the total unacknowledged occurrences of the alarm, e.g., previous unprocessed alarm instances count [0 . . . N] where N is an integer. For example, the total unacknowledged count can be determined based on the unprocessed previous alarm count and the current alarm acknowledgement state. Examples of the function blocks of the alarm function 140 are further described below with reference to the examples in FIGS. 6-8.

Figure 6:
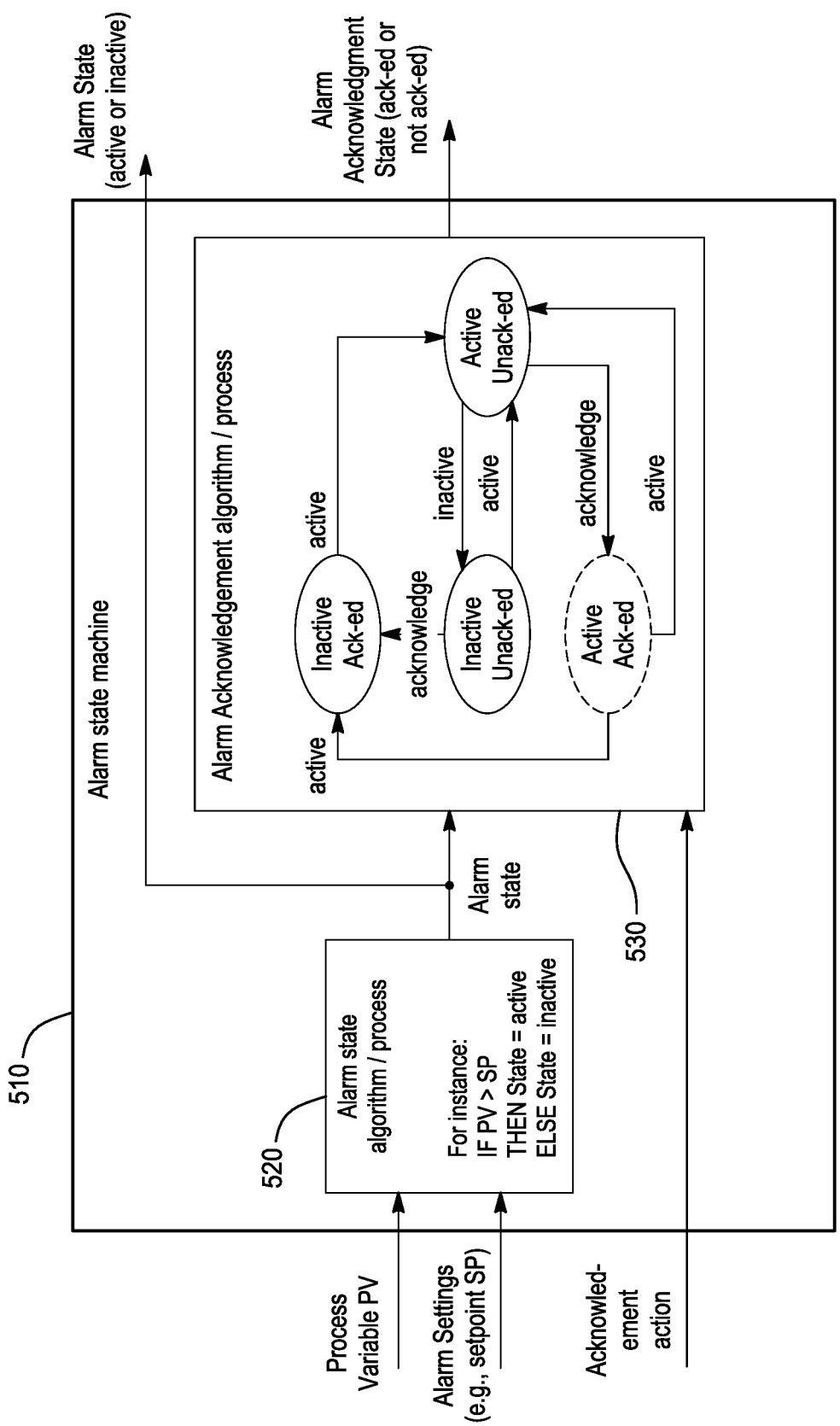
FIG. 6 illustrates an example alarm state machine, in accordance with an embodiment of the present disclosure.

FIG. 6 illustrates an example alarm state machine, such as for example function block 510 in FIG. 5, in accordance with an embodiment of the present disclosure. As shown in FIG. 6, the alarm state machine 510 can include alarm state algorithm/process 520 and alarm acknowledgement algorithm/process 530.

The alarm state algorithm/process 520 can be configured to generate an alarm state, e.g., activating or de-activating an alarm, based on process data (e.g., process value/variable PV) and alarm criteria (e.g., alarm settings such as setpoint SP for the PV). For example, if the PV is greater than the SP, the alarm state is Active; otherwise, the alarm state is Inactive.

The alarm acknowledgement algorithm/process 530 is configured to determine if the current or most recent occurrence of the alarm, whether currently active or not, is acknowledged or unacknowledged based on the alarm state from the alarm state algorithm/process 520 and the acknowledgement action (or information associated therewith) received from the user (e.g. via the user device).

The information from the alarm state is used to determine when a new occurrence of the alarm has occurred, which has not been acknowledged. For example, as shown in the state diagram in FIG. 6, when a new occurrence of the alarm occurs, the algorithm/process 530 is initially at the active and unacknowledged state. From the active and unacknowledged state, if the alarm state changes to inactive, then the algorithm/process 530 proceeds to the inactive and unacknowledged state. From the inactive and unacknowledged state, if the alarm state changes to active, then the algorithm/process 530 proceeds back to the active and unacknowledged state indicating a new occurrence of the alarm (and thus a new current occurrence of the alarm). Alternatively, from the inactive and unacknowledged state, if an acknowledgement is received, then the algorithm/process 530 proceeds to the inactive and acknowledged state; thereafter, when the alarm state changes to active, then the algorithm/process 530 proceeds back to the active and unacknowledged state indicating a new occurrence of the alarm.

As further shown in the state diagram in FIG. 6, from the active and unacknowledged state, if an acknowledgement is received while the alarm is still active, then the algorithm/process 520 can proceed to the active and acknowledged state. From the active and acknowledged state, the algorithm/process 520 can proceed in two different optional ways. For example, in the first optional approach, the algorithm/process 520 can proceed to the inactive and acknowledged state when the alarm state turns inactive. From the inactive and acknowledged state, the algorithm/process 520 can proceed back to the active and unacknowledged state when the alarm state turns active again indicating a new occurrence of the alarm. In the second optional approach, from the active and acknowledged state, the algorithm/process 520 can proceed back to the active and unacknowledged state. The second optional approach may be used when an occurrence of an alarm is inordinately long, e.g., ongoing time period of the alarm occurrence exceeds a predefined alarm time period.

Figure 7:
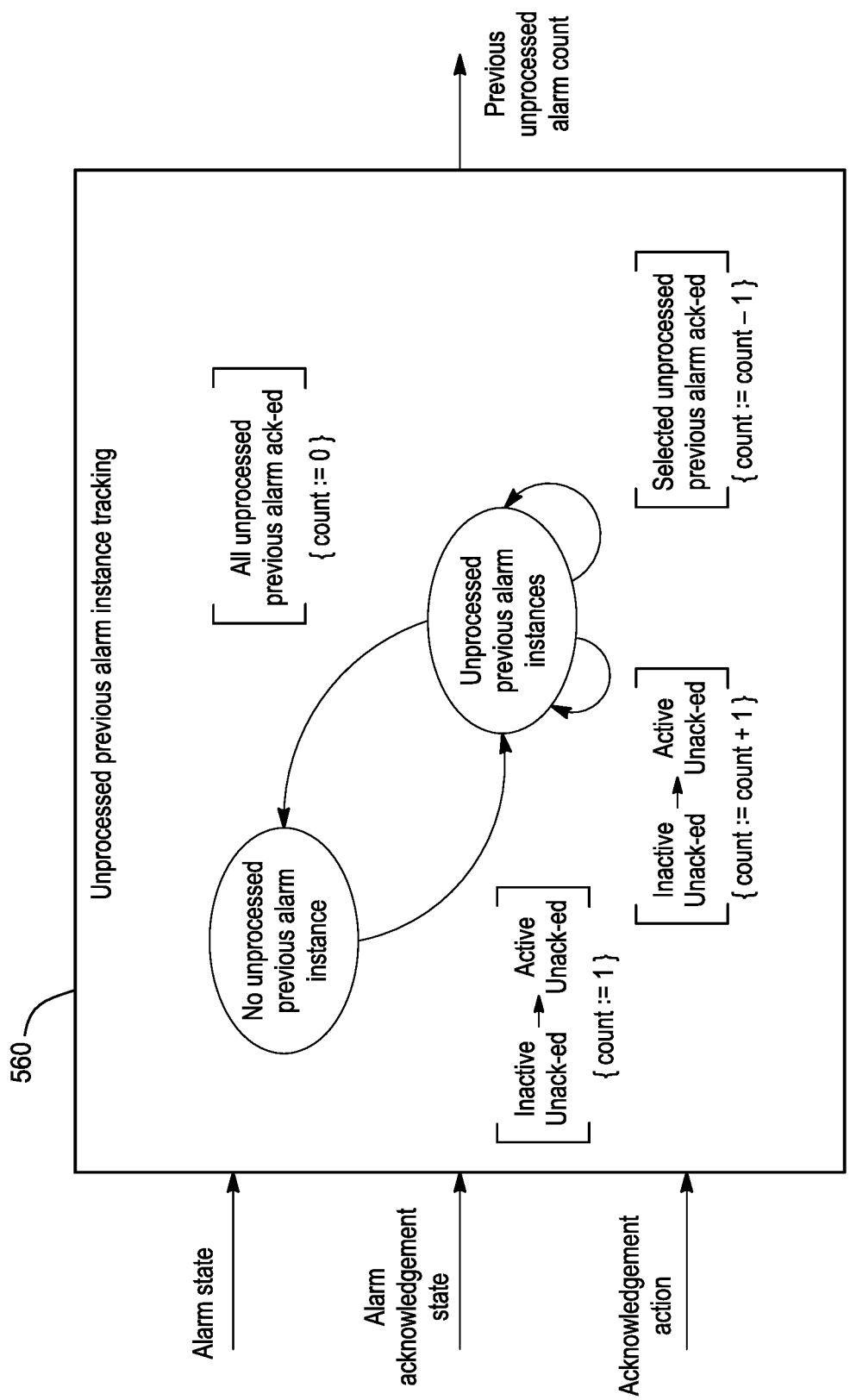
FIG. 7 illustrates an example functional block diagram of unprocessed previous alarm instance tracking, in accordance with an embodiment of the present disclosure.

FIG. 7 illustrates an example state diagram for Unprocessed previous alarm instance tracking, such as in 560 of FIG. 5, in accordance with an embodiment of the present disclosure. The function block 560 is configured to track unacknowledged prior occurrences of the alarm based on the alarm state, alarm acknowledgement state and the acknowledgement action. In this example the function block 560 can track and output a count of unacknowledged prior occurrences of the alarm (e.g., previous unprocessed alarm count).

For example, as shown by the state diagram in FIG. 7, the function block 560 can begin at the state of no unprocessed previous alarm instance (also referred to as "State 1") or Count=0, such as when the process to be monitored is initiated. At the start of the process, it is assumed that there are no prior occurrences of the alarm, and the alarm state and the alarm acknowledgement state are inactive and unacknowledged, respectively (e.g., [inactive, unacknowledged]).

After a first occurrence of the alarm, when the alarm state becomes active again (e.g., [inactive, unacknowledged]→ [active, unacknowledged]), the count is incremented to 1 or Count=1 and the function block 560 proceeds to the state of unprocessed previous alarm instances (also referred to as "State 2"). In other words, when Count=1, it indicates that there is one unacknowledged occurrence of the alarm. In State 2, whenever a new occurrence of the alarm occurs (e.g., state alarm changes from inactive to active), the function block 560 increments the count or Count=Count+1; and whenever a selected unacknowledged prior occurrence of the alarm is acknowledged, the function block 560 decrements the count or Count=Count−1. The function block 560 proceeds back to State 1, when there are no more unacknowledged prior occurrences of the alarm (e.g., Count=0).

Figure 8:
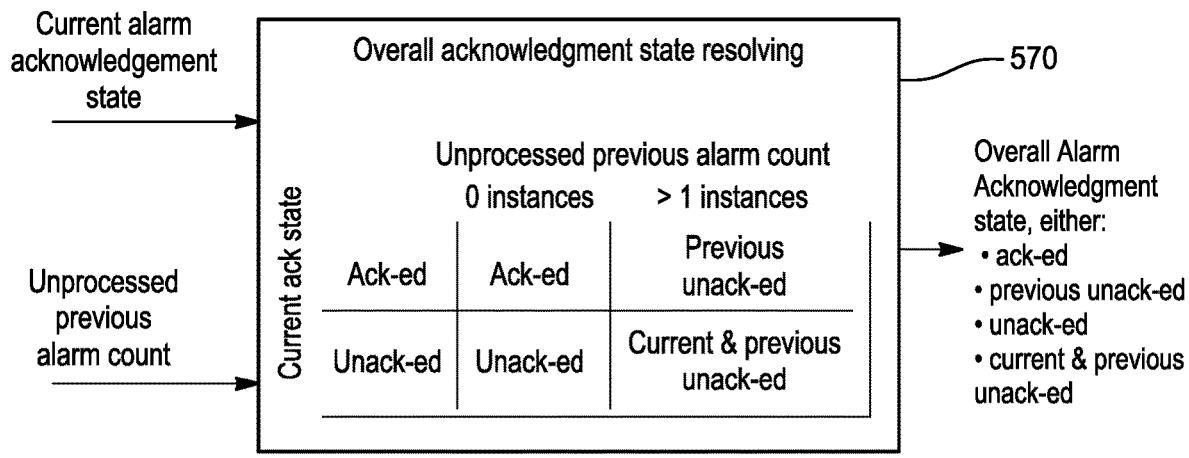
FIG. 8 illustrates an example functional block diagram of overall acknowledgment state resolving, in accordance with an embodiment of the present disclosure.

FIG. 8 illustrates an example of an overall acknowledgement state resolving, such as for example shown as function block 570 in FIG. 5, in accordance with an embodiment of the present disclosure. The function block 570 is configured to determine and output an overall alarm acknowledgement state based on the current alarm acknowledgement state (e.g., from function block 530 in FIGS. 5 and 6) and the unprocessed previous alarm count (e.g., from function block 560 in FIGS. 5 and 7).

For example, as shown in FIG. 8, an example decision table is provided to determine the overall alarm acknowledgement state, which can, for example, be: (1) Acknowledged (e.g., the current occurrence of the alarm is acknowledged), (2) Prior/Previous Unacknowledged (e.g., one or more prior occurrences of the alarm are unacknowledged), (3) Unacknowledged (e.g., the current occurrence of the alarm is unacknowledged) or (4) Current & Previous Unacknowledged (e.g., the current occurrence of the alarm and one or more prior occurrences of the alarm are unacknowledged). The overall alarm acknowledgement state is Acknowledged when the current alarm acknowledgement state is acknowledged and the unprocessed previous alarm count is zero (e.g., Count=0). The overall alarm acknowledgement state is Prior/Previous Unacknowledged when the current alarm acknowledgement state is acknowledged and the unprocessed previous alarm count is greater than 1 (e.g., Count>1). The overall alarm acknowledgement state is Unacknowledged when the current alarm acknowledgement state is unacknowledged and the unprocessed previous alarm count is zero (e.g., Count=0). The overall alarm acknowledgement state is Current & Prior/Previous Unacknowledged when the current alarm acknowledgement state is unacknowledged and the unprocessed previous alarm count is greater than 1 (e.g., Count>1).

Figure 9:
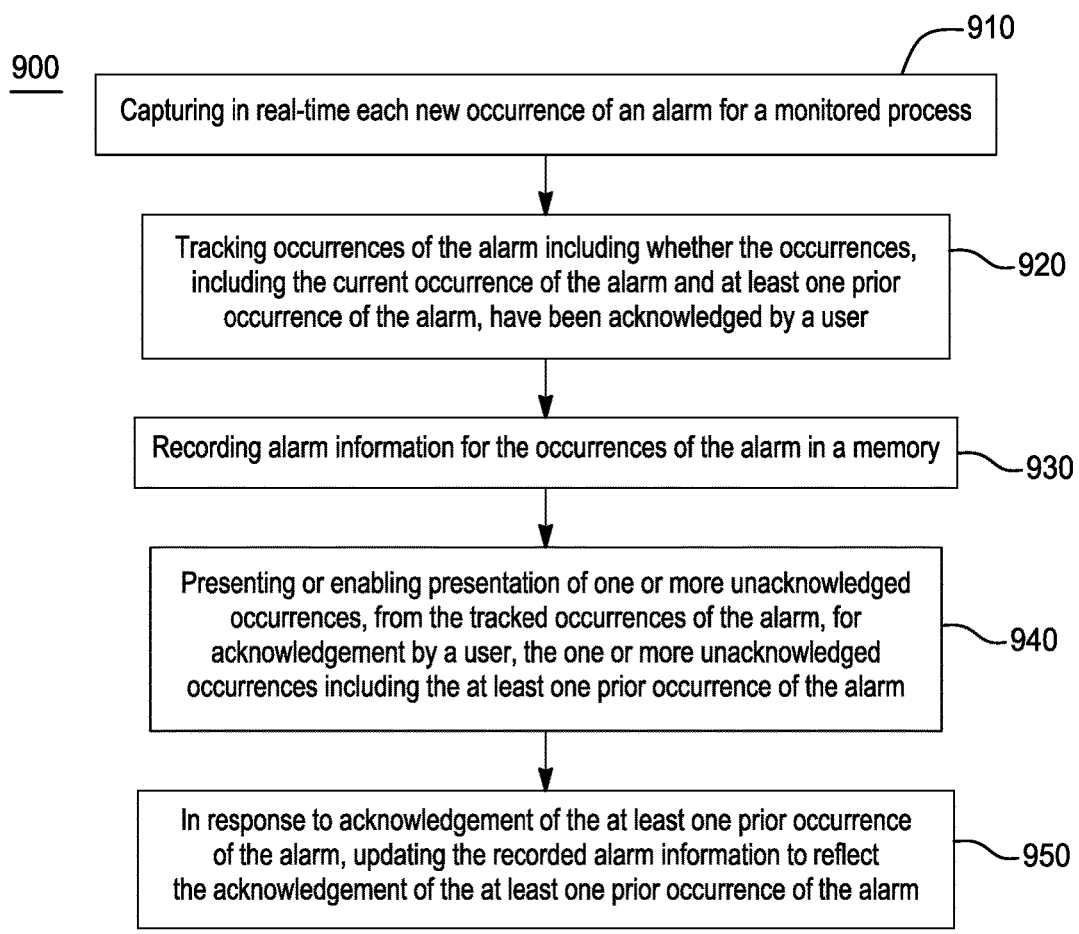
FIG. 9 illustrates a flow diagram showing an example process for managing current and prior occurrences of an alarm, in accordance with an embodiment of the present disclosure.

FIG. 9 illustrates a flow diagram showing an example process 900 for managing current and prior occurrences of an alarm, in accordance with an embodiment of the present disclosure. For the purposes of explanation, the various operations of the process 900 can be implemented using the various devices and systems shown in the example of FIG. 1, such as PM device and user device, individually or in combination.

The process begins at block 910, where each new occurrence of an alarm is captured in real-time for a monitored process. The alarm can be active or inactive based on an alarm criteria and at least process data, including one or more process values, of a monitored process. Each new occurrence of the alarm can supersede a prior occurrence of the alarm as a current occurrence of the alarm.

At block 920, occurrences of the alarm are tracked, which can include whether the occurrences, including the current occurrence of the alarm and at least one prior occurrence of the alarm, have been acknowledged by a user.

At block 930, alarm information is recorded for the occurrences of the alarm in a memory. The alarm information can include each occurrence of the alarm and information associated therewith including a timestamp of the occurrence and whether the occurrence of the alarm is acknowledged or not by the user.

At block 940, one or more unacknowledged occurrences from the tracked occurrences of the alarm are presented or enabled to be presented, for acknowledgement by a user. The one or more unacknowledged occurrences can include the at least one prior occurrence of the alarm.

At block 950, in response to acknowledgement of the at least one prior occurrence of the alarm, the recorded alarm information can be updated to reflect the acknowledgement of the at least one prior occurrence of the alarm.

FIGS. 10 through 20 illustrate an example alarm management implementation 1000, in accordance with an embodiment of the present disclosure. For the purpose of explanation, the operations in this example implementation are described with reference to a process (e.g., 110) to be monitored, a PM device (e.g., 130), and a user device (e.g., 180) and a user such as an operator (e.g., 190). Furthermore, the user device can present (e.g., display) a current alarms table 1010, which presents alarm information related to at least an unacknowledged current occurrence of one or more alarms; and the PM device can record alarm information for each occurrence of one or more alarms in an alarm history table 1020. In various embodiments, the operator can access the alarm history table 1020 through a graphical user interface (GUI) of the user device. For the purposes of explanation, the example alarm management implementation 100 will be described with reference to one alarm (or type of alarm), e.g., Abs Hi.

Figure 10:
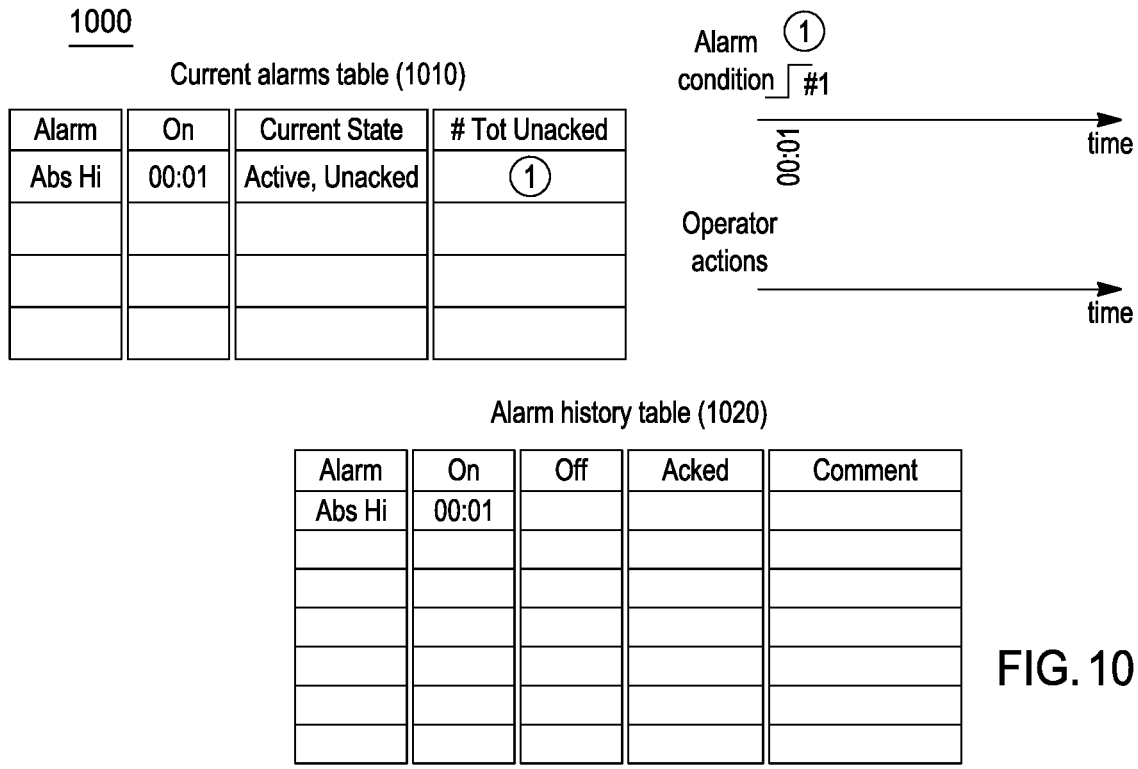
FIGS. 10 through 20 illustrate an example alarm management implementation, in accordance with an embodiment of the present disclosure.

The example implementation 1000 begins at FIG. 10, which shows, on the alarm condition graph, a new occurrence of an alarm (e.g., Abs Hi) that becomes active at time 00:01 (e.g., where AA can indicate hour(s) and BB indicated minute(s) in the time format AA:BB). The PM device can determine/generate and capture the new occurrence of the alarm; track the occurrences of the alarm including the number of unacknowledged prior occurrences of the alarm and the total number of unacknowledged occurrences of the alarm; record alarm information for the new occurrence of the alarm, such as for example in the alarm history table 1020; and provide alarm information to the user device for presentation to the user. As shown in FIG. 10, the alarm history table 1020 is updated to include alarm information for the new occurrence of the alarm (e.g., #1), in this case, the name of the alarm (e.g., Abs Hi) and the ON time of the new occurrence of the alarm (e.g., time 00:01).

As further shown in FIG. 10, the user device can present the current alarms table 1010 with the information for the current occurrence of the alarm (e.g., #1), such as the name of the alarm (e.g., Abs Hi), the ON time of the occurrence of the alarm, the current state for the alarm (e.g., Active and Unacknowledged) and the total under of unacknowledged occurrences of the alarm (e.g., 1).

Figure 11:
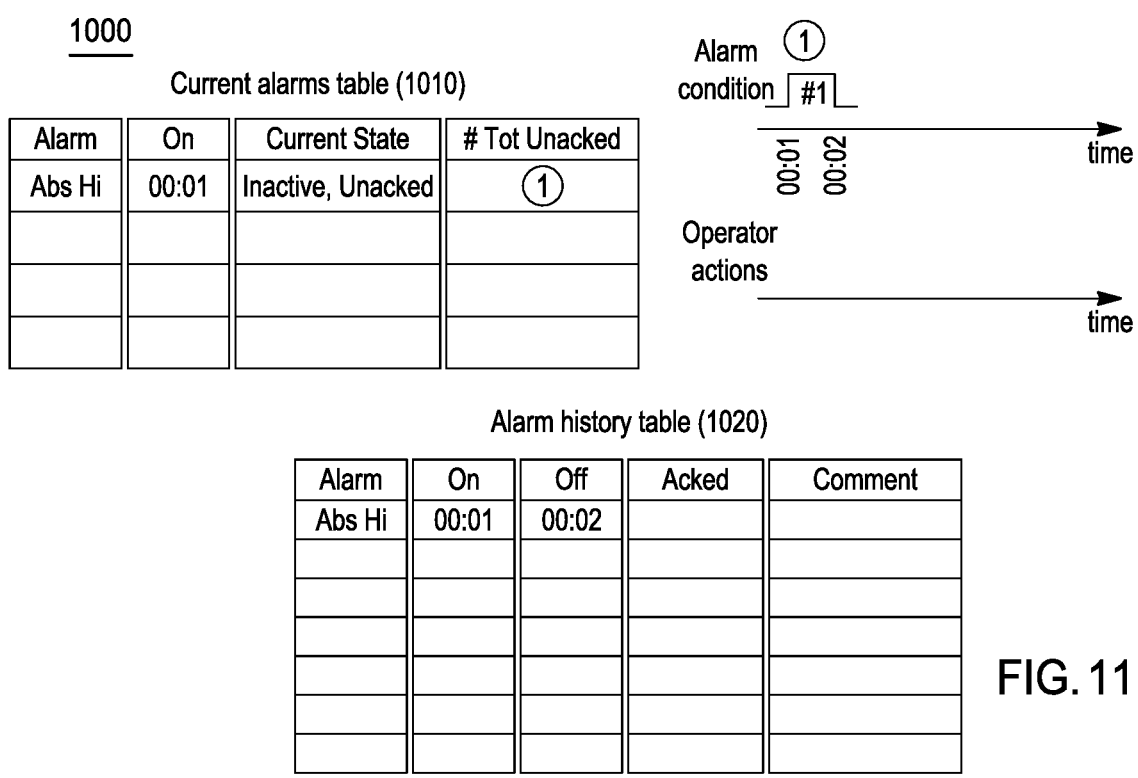

Next, as shown in FIG. 11, the alarm condition graph shows that the alarm (e.g., Abs Hi) has become inactive. The current alarms table 1010 is updated to indicate that the current state of the current occurrence of the alarm, e.g., #1, is inactive and unacknowledged. The alarm history table 1020 is also updated to indicate the OFF time (e.g., 00:02) of the current occurrence of the alarm, e.g., #1.

Figure 12:
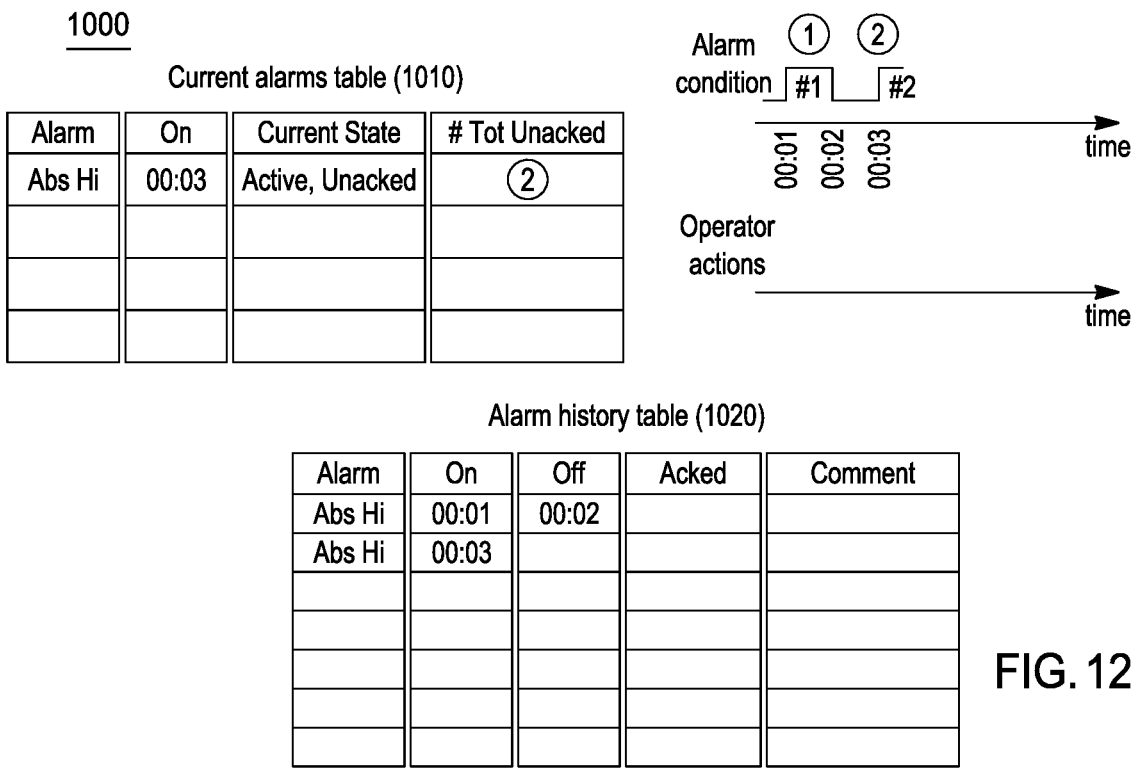

Next, as shown in FIG. 12, the alarm condition graph shows that the alarm (e.g., Abs Hi) has become active again. This indicates a new occurrence of the alarm, e.g., #2. This new occurrence of the alarm, e.g., #2, supersedes the prior occurrence of the alarm (e.g., #1) as the "current" occurrence of the alarm, which is to be presented to the user. For example, as shown in FIG. 12, the current alarms table 1010 now presents information for the new occurrence of the alarm, e.g., #2, such as the name of the alarm (Abs Hi), the ON time (e.g., 00:03), the current state (e.g., active and unacknowledged), and total unacknowledged (e.g., 2). The alarm history table 1020 is also updated to include alarm information for the new occurrence of the alarm, such as the name of the alarm (e.g., Abs Hi) and the ON time (e.g., 00:003). At this stage, neither of the two occurrences of the alarm has been acknowledged.

Figure 13:
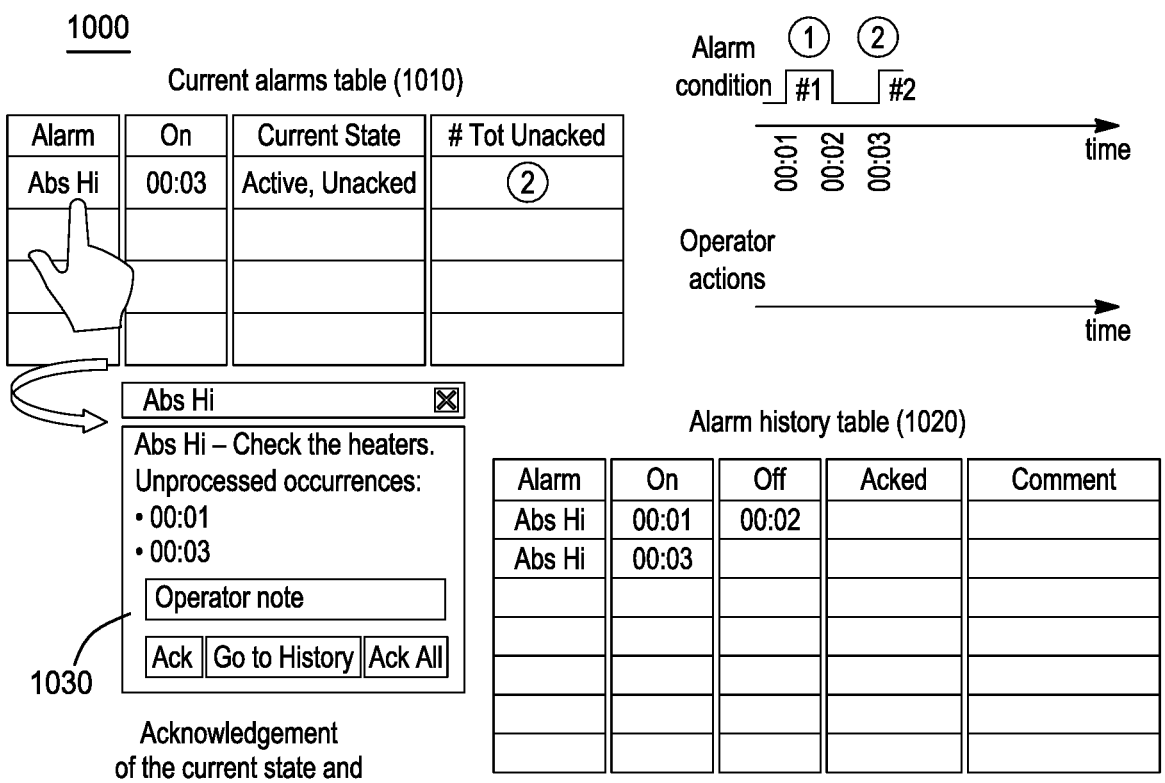

Next, as shown in FIG. 13, the operator selects the current occurrence of the alarm (e.g. Abs Hi) on the current alarms table 1010, which results in the presentation of a graphical window 1030 identifying the alarm type and information associated therewith (e.g., Abs Hi—Check the heaters), the unprocessed occurrences at time 00:01 (#1) and at time 00:03 (#2). The graphical window 1030 also provides graphical inputs for receiving user input, such as a text box for the operator to enter comments/notes, an Acknowledgement (Ack) button to select and acknowledge the current unacknowledged occurrence of the alarm, an Acknowledge All (Ack All) button to select all unacknowledged occurrences of the alarm to acknowledge, and a Go to History button to access the alarm history table 1020.

Figure 14:
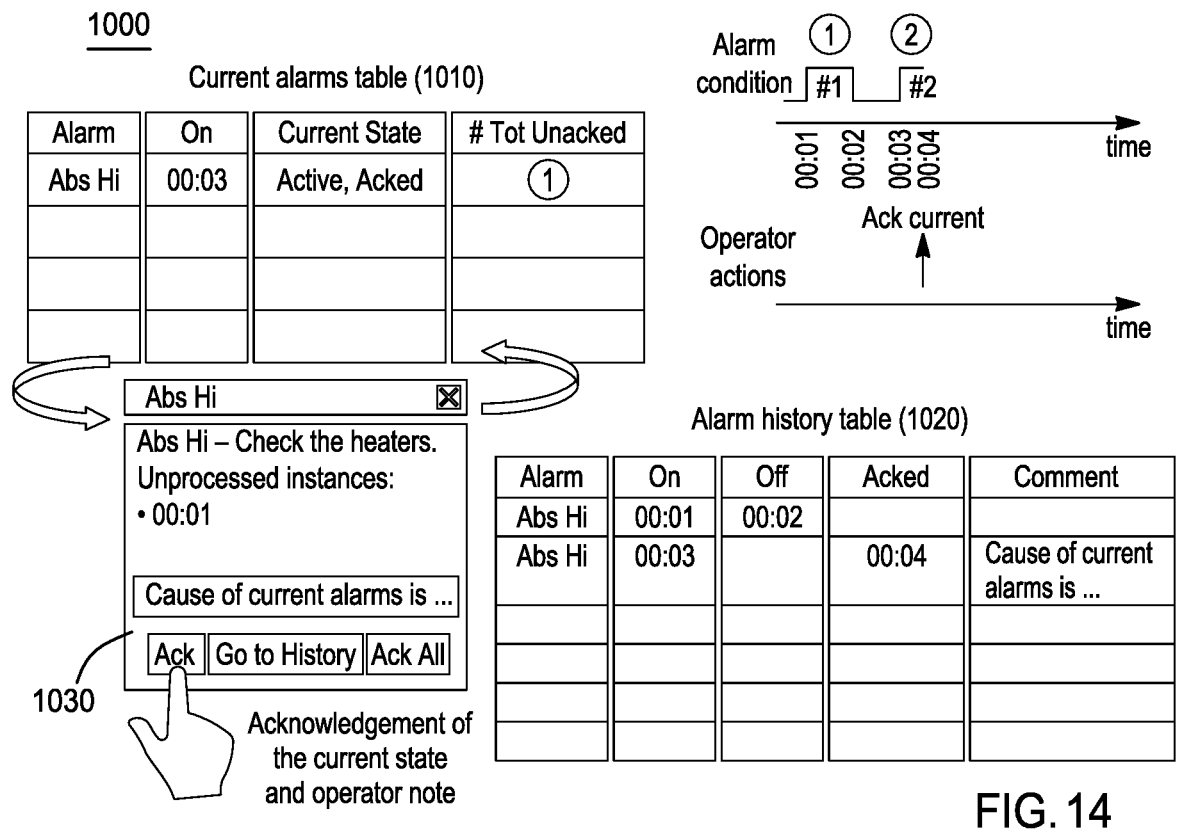

Next, as shown in FIG. 14, on the window 1030, the operator inputs comments in the text box (e.g., Cause of current alarms is . . . ) and selects the Ack button to acknowledge the current occurrence of the alarm, e.g., #2 (00:03). The acknowledgement action occurs at time 00:04 as shown on the operator actions graph. The alarms history table 1020 is updated to reflect the additional alarm information for the current occurrence of the alarm (#2) indicating the acknowledgement at time 00:04 and the operator's comments. Furthermore, the graphical window 1030 also is updated to remove the current occurrence of the alarm, e.g., #2 (00:03) from the listing of unacknowledged occurrences of the alarm. The current alarms table (1010) is also updated to reflect that the current state is active and acknowledged, and the total number of unacknowledged occurrences is one (1).

Figure 15:
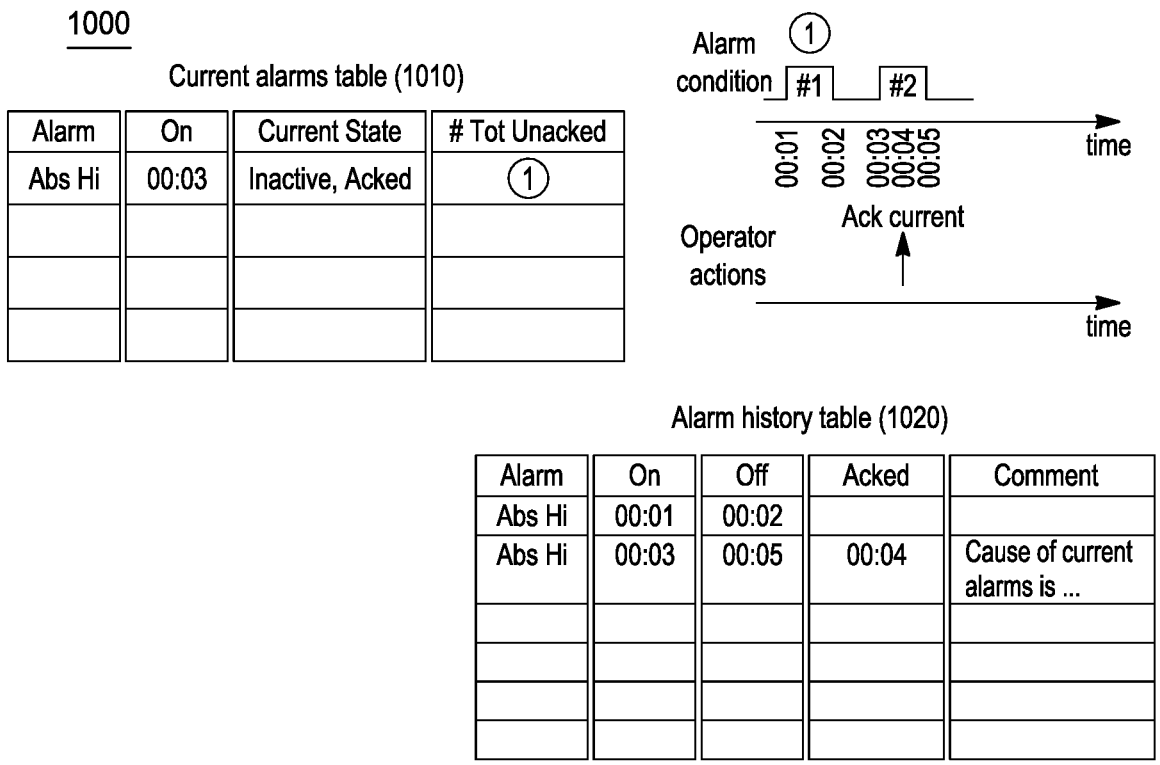

Next, as shown in FIG. 15, the alarm condition graph shows that the alarm (e.g., Abs Hi) has become inactive again. The current alarms table 1010 is updated to indicate that the current state of the current occurrence of the alarm, e.g., #2, is inactive and acknowledged. The alarm history table 1020 is also updated to indicate the OFF time (e.g., 00:05) of the current occurrence of the alarm, e.g., #2.

Figure 16:
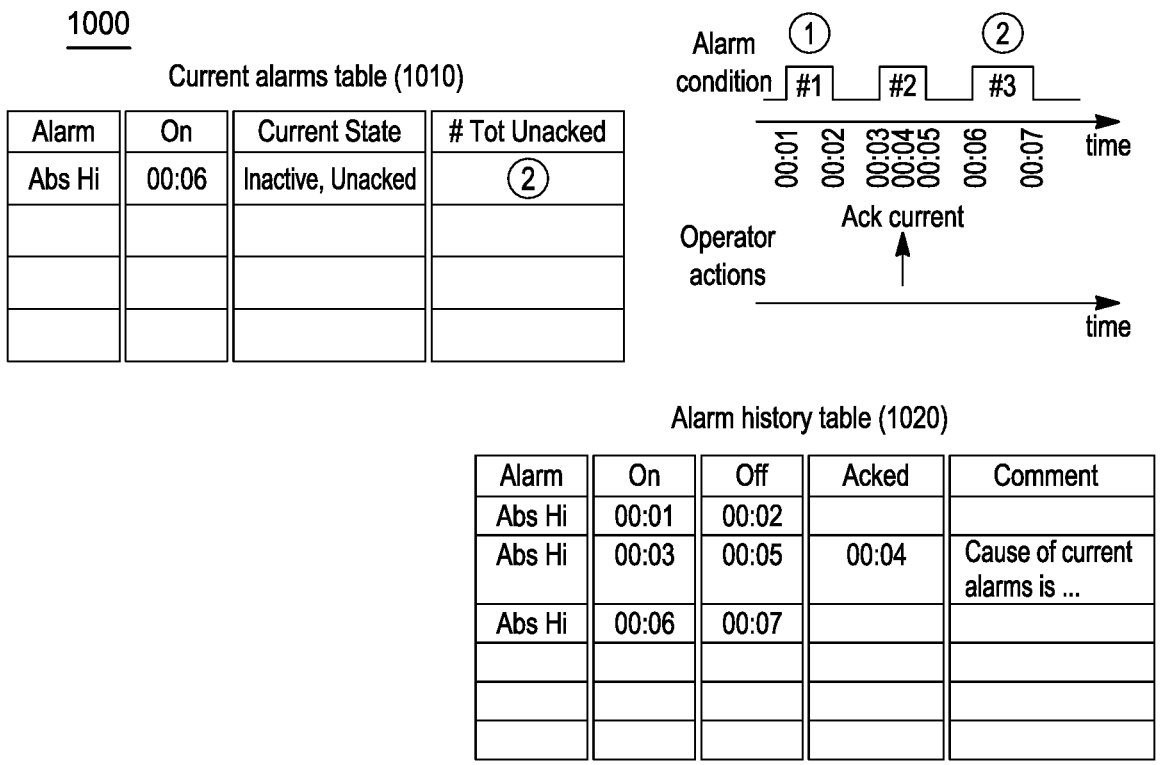

Next, as shown in FIG. 16, the alarm condition graph shows that the alarm (e.g., Abs Hi) has become active at time 00:06 and inactive again at time 00:07, which indicates a new occurrence of the alarm, e.g., #3. The current alarms table 1010 is updated over this period to indicate that the alarm information for the new occurrence of the alarm, such as the name of the alarm (e.g., Abs Hi), the ON time (e.g., 00:06), the current state (e.g., inactive and unacknowledged), and the total number of unacknowledged occurrences of the alarm (e.g., 2). The alarm history table 1020 is also updated to indicate the new occurrence of the alarm, such as the name of the alarm (e.g., Abs Hi), the ON time (e.g., 00:06), and the OFF time (e.g., 00:07).

Figure 17:
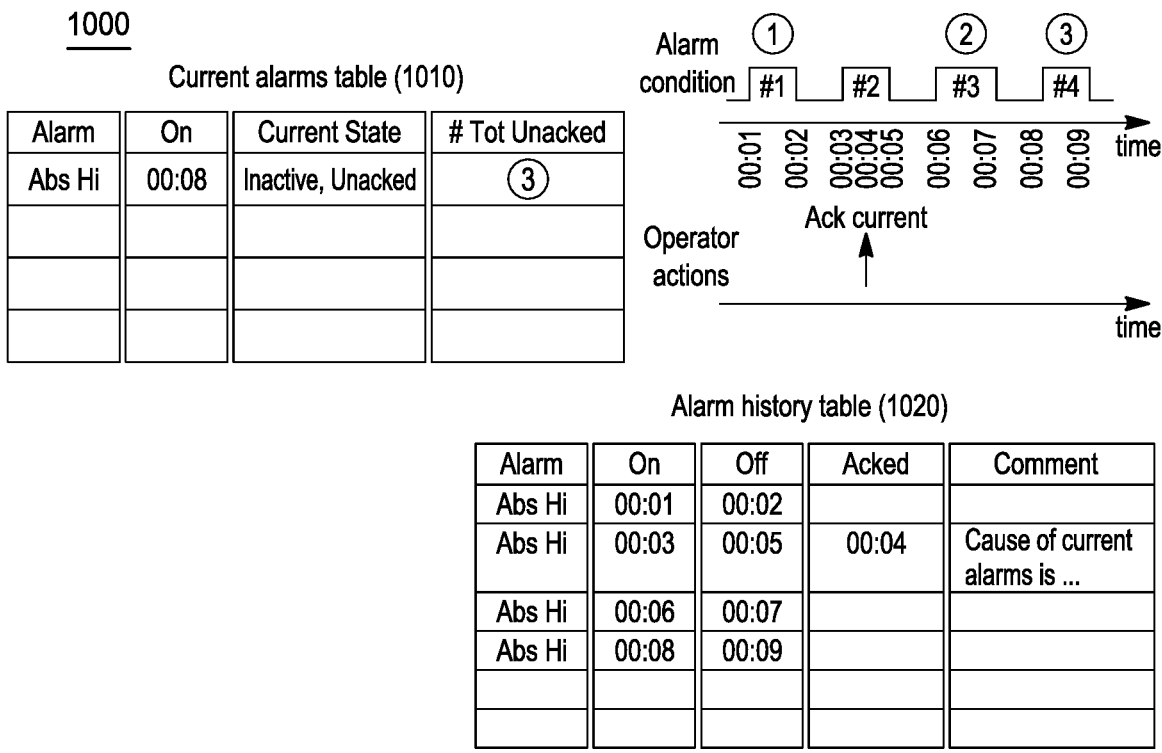

Next, as shown in FIG. 17, the alarm condition graph shows that the alarm (e.g., Abs Hi) has become active at time 00:08 and inactive again at time 00:09, which indicates a new occurrence of the alarm, e.g., #4. The current alarms table 1010 is updated over this period to indicate that the alarm information for the new occurrence of the alarm, such as the name of the alarm (e.g., Abs Hi), the ON time (e.g., 00:08), the current state (e.g., inactive and unacknowledged), and the total number of unacknowledged occurrences of the alarm (e.g., 3). The alarm history table 1020 is also updated to indicate the new occurrence of the alarm, such as the name of the alarm (e.g., Abs Hi), the ON time (e.g., 00:08), and the OFF time (e.g., 00:09).

Figure 18:
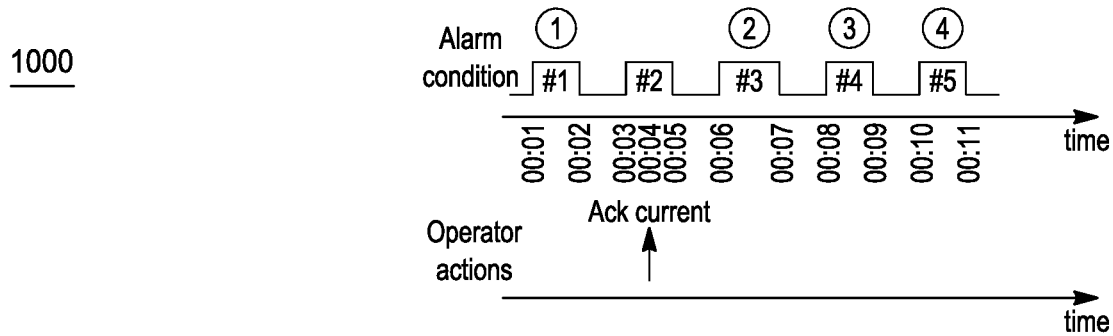

Next, as shown in FIG. 18, the alarm condition graph shows that the alarm (e.g., Abs Hi) has become active at time 00:10 and inactive again at time 00:11, which indicates a new occurrence of the alarm, e.g., #5. The current alarms table 1010 is updated over this period to indicate that the alarm information for the new occurrence of the alarm, such as the name of the alarm (e.g., Abs Hi), the ON time (e.g., 00:10), the current state (e.g., inactive and unacknowledged), and the total number of unacknowledged occurrences of the alarm (e.g., 4). The alarm history table 1020 is also updated to indicate the new occurrence of the alarm, such as the name of the alarm (e.g., Abs Hi), the ON time (e.g., 00:10), and the OFF time (e.g., 00:11).

Figure 19:
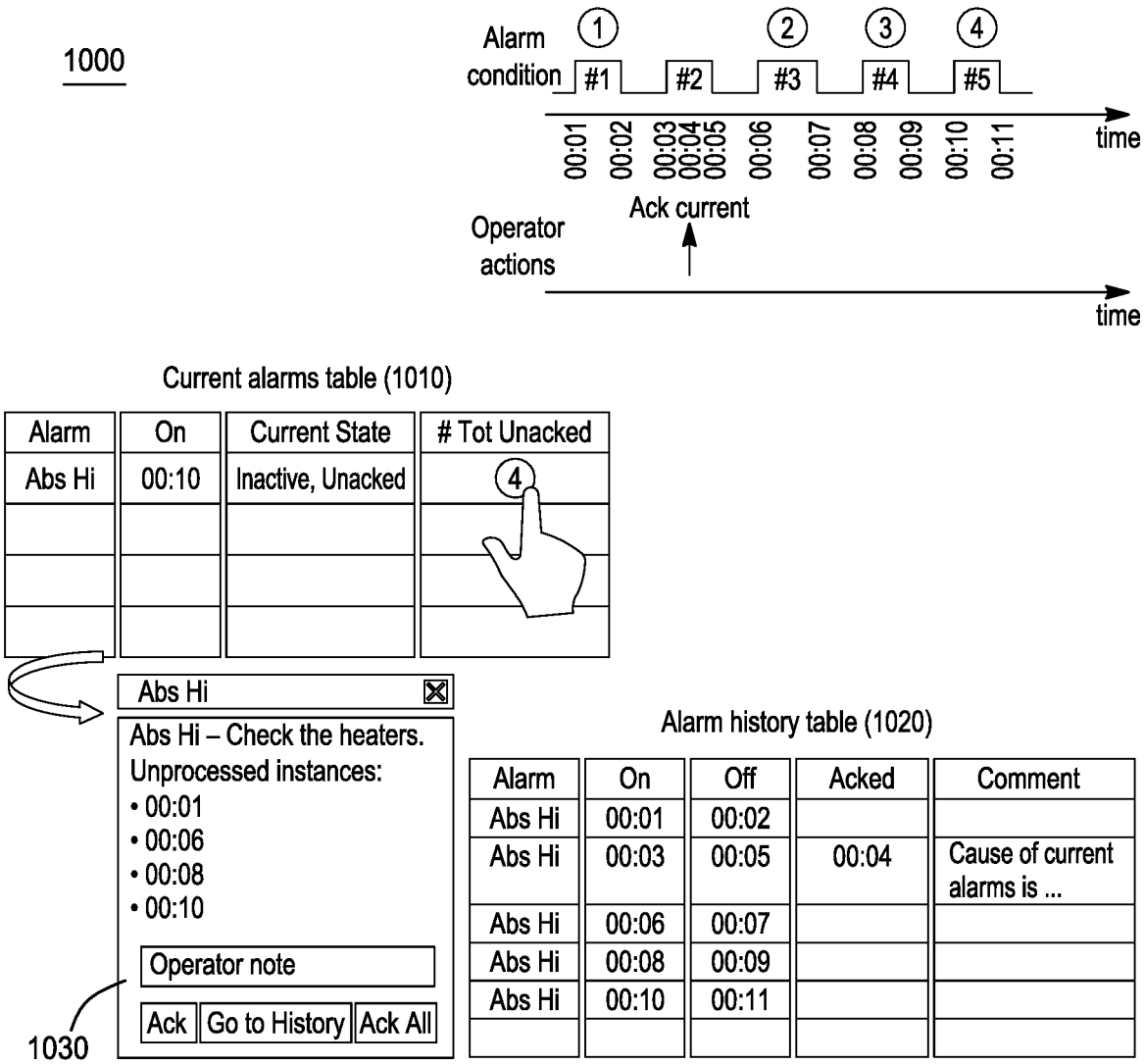

Next, as shown in FIG. 19, the operator selects the total number of unacknowledged occurrences for the current occurrence of the alarm (e.g. Abs Hi) on the current alarms table 1010, which results in the presentation of a graphical window 1030 identifying the alarm type and information associated therewith (e.g., Abs Hi—Check the heaters), and the unprocessed occurrences at time 00:01 (#1), at time 00:06 (#3), at time 00:08 (#4) and at time 00:10 (#5). The graphical window 1030 also provides graphical inputs for receiving user input, such as a text box for the operator to enter comments/notes, an Acknowledgement (Ack) button to select and acknowledge the current unacknowledged occurrence of the alarm, an Acknowledge All (Ack All) button to select all unprocessed occurrences of the alarm to acknowledge, and a Go to History button to access the alarm history table 1020.

Figure 20:
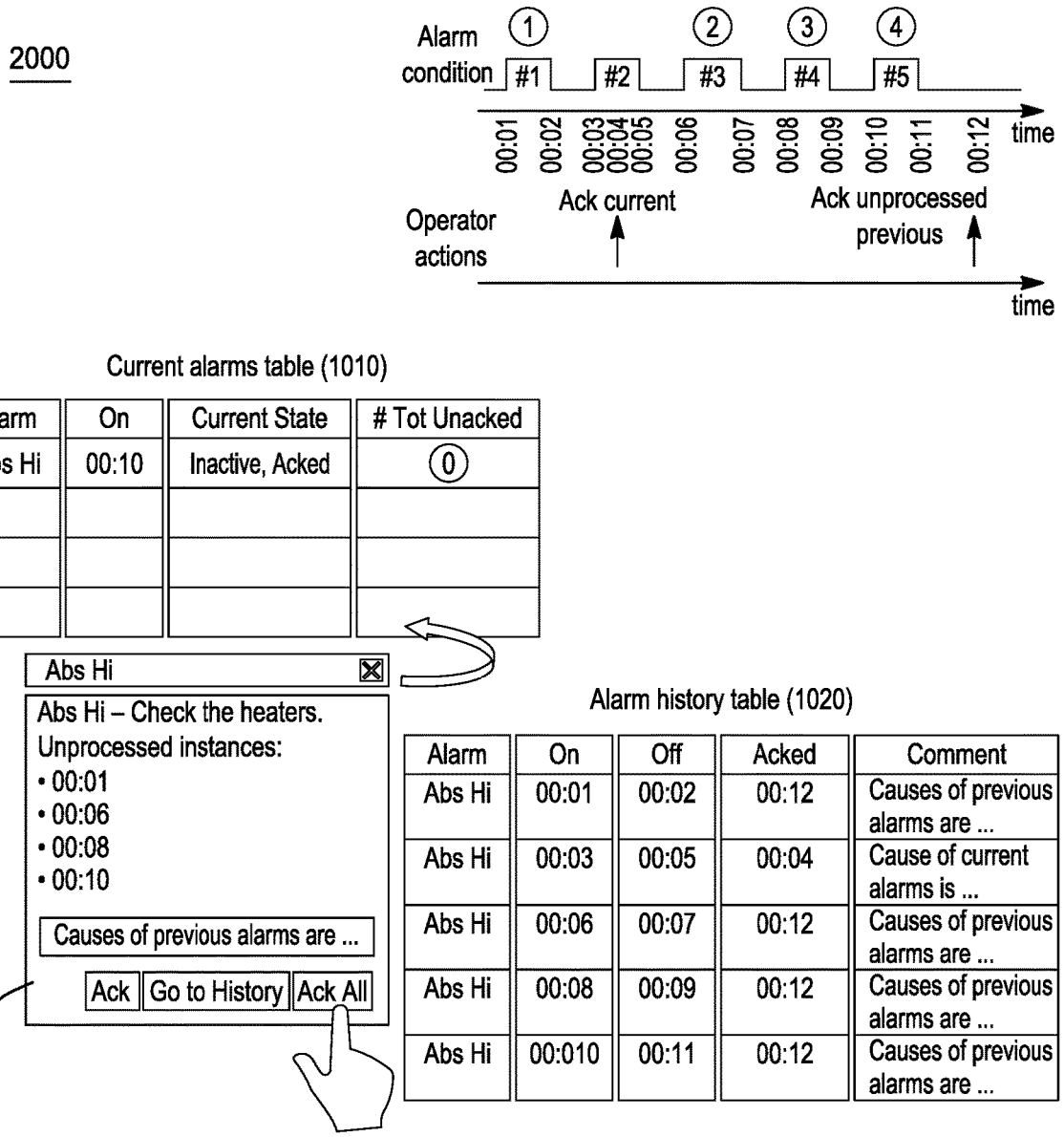

Next, as shown in FIG. 20, on the window 1030, the operator inputs comments in the text box (e.g., Cause of previous alarms are . . . ) and selects the Ack All button to acknowledge all of the unacknowledged occurrences of the alarm, e.g., #1 (00:01), #3 (00:06), #4 (00:08) and #5 (00:10). The acknowledgement action for all of the unacknowledged occurrences of the alarm occurs at time 00:12 as shown on the operator actions graph. The alarms history table 1020 is updated to reflect the additional alarm information for the current occurrence of the alarm (#5) and prior unacknowledged/unprocessed prior occurrences of the alarm (e.g., #1, #3 and #4) indicating their acknowledgement at time 00:12 and the operator's comments. Furthermore, the window 1030 also is closed and the current alarms table (1010) is updated to reflect the information for the current occurrence of the alarm (e.g., #5) and that there are currently no unacknowledged occurrences of the alarm (e.g., the total number of unacknowledged occurrences is zero). Alternatively, when all occurrences of the alarm have been acknowledged, the current alarms table (1010) may instead be blank, in accordance with an embodiment.

FIGS. 21 through 24 illustrate an example alarm management implementation 2100, in accordance with another embodiment of the present disclosure. The alarm management implementation is an alternative implementation to the example implementation 1000 shown in FIGS. 19-20.

Figure 21:
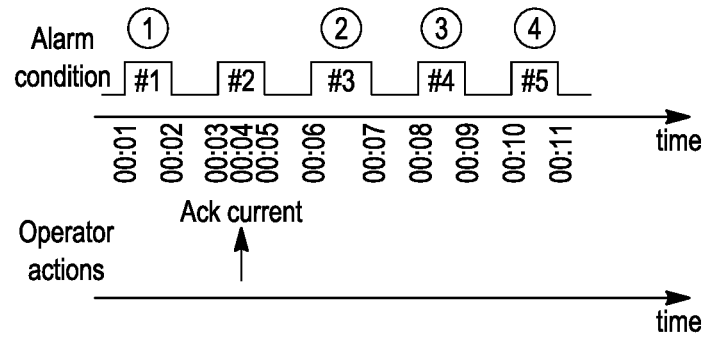
FIGS. 21 through 24 illustrate an example alarm management implementation, in accordance with another embodiment of the present disclosure.

For example, the alarm management implementation 2100 of FIG. 21 is basically the same as that shown in FIG. 18 for the alarm management implementation 1000, except that the operator is shown as selecting the total number of unacknowledged occurrences for the current occurrence of the alarm on the current alarms table 1010. As further shown in FIG. 21, the current alarms table 1010 shows the information for the current occurrence of the alarm, e.g., #5, in which the total number of unacknowledged/unprocessed occurrences of the alarm is four (4). The alarm history table 1020 also shows the alarm information for the five occurrences of the alarm (e.g., #1, #2, #3, #4 and #5). At this point in time, occurrences #1, #3, #4 and #5 have not been acknowledged yet by the operator.

Figure 22:
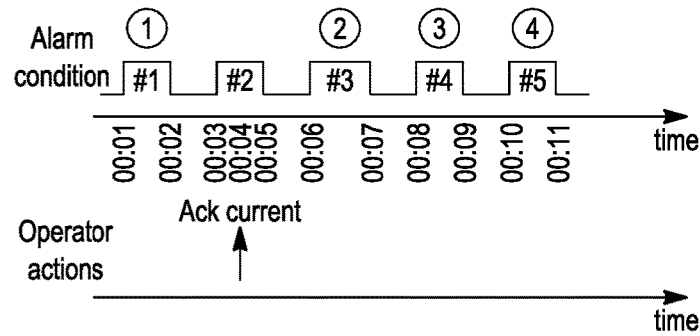

Next, as shown in FIG. 22, the graphical window 1030 is presented to the operator in response to the user selection. The graphical window 1030 identifies the alarm type and information associated therewith (e.g., Abs Hi—Check the heaters), and the unprocessed occurrences such as at time 00:01 (#1), at time 00:06 (#3), at time 00:08 (#4) and at time 00:10 (#5). The graphical window 1030 also provides graphical inputs for receiving user input, such as a text box for the operator to enter comments/notes, an Acknowledgement (Ack) button to select and acknowledge the current unacknowledged occurrence of the alarm, an Acknowledge All (Ack All) button to select all unprocessed occurrences of the alarm to acknowledge, and a Go to History button to access the alarm history table 1020.

In this example, the operator selects the Go to History button, which links to the alarm history table 1020 and automatically filters the table 1020 on the specific alarm (e.g., Abs Hi). The filtered alarm occurrences from the alarm history table 1020 are presented to the operator.

Figure 23:
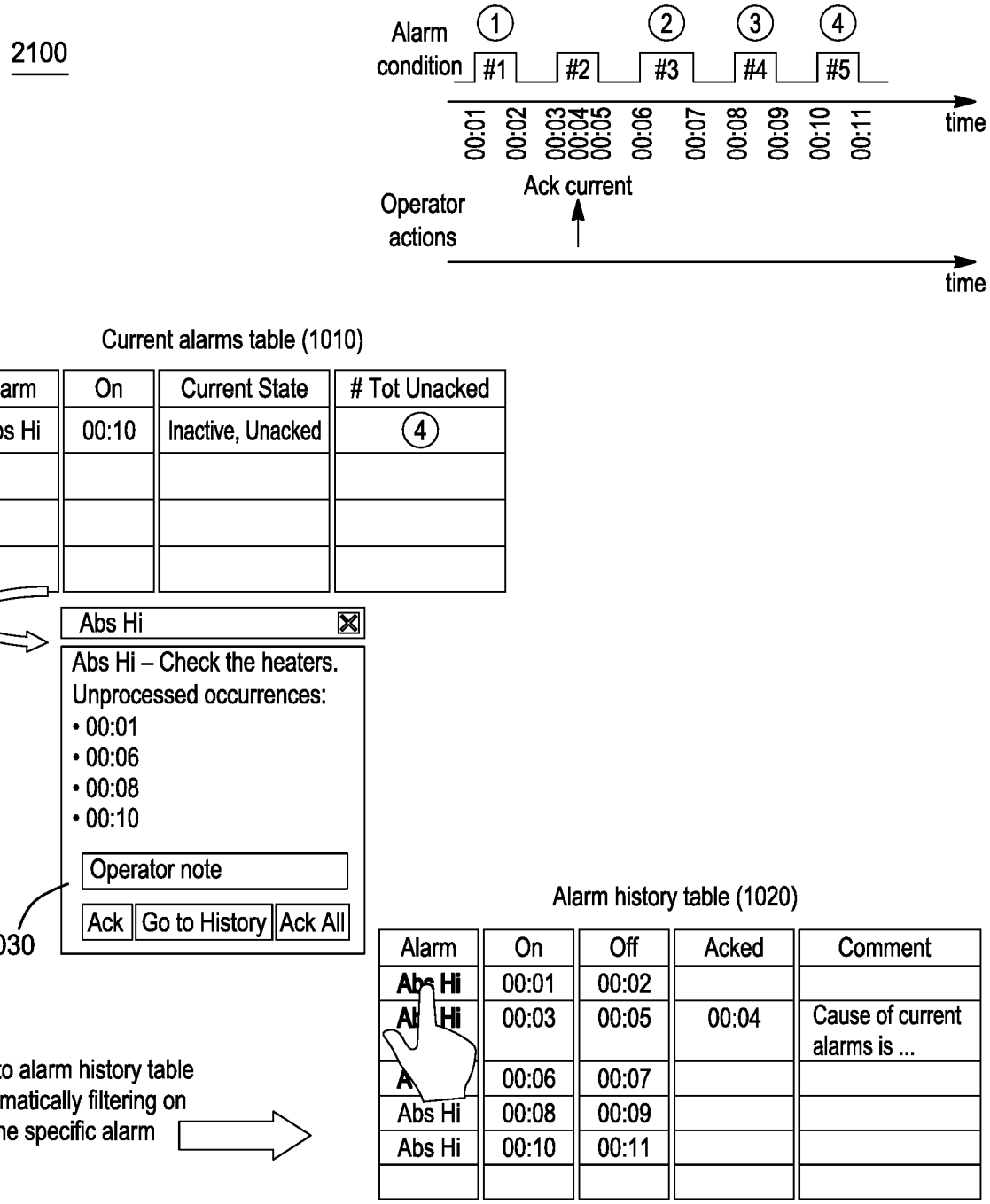
Figure 24:
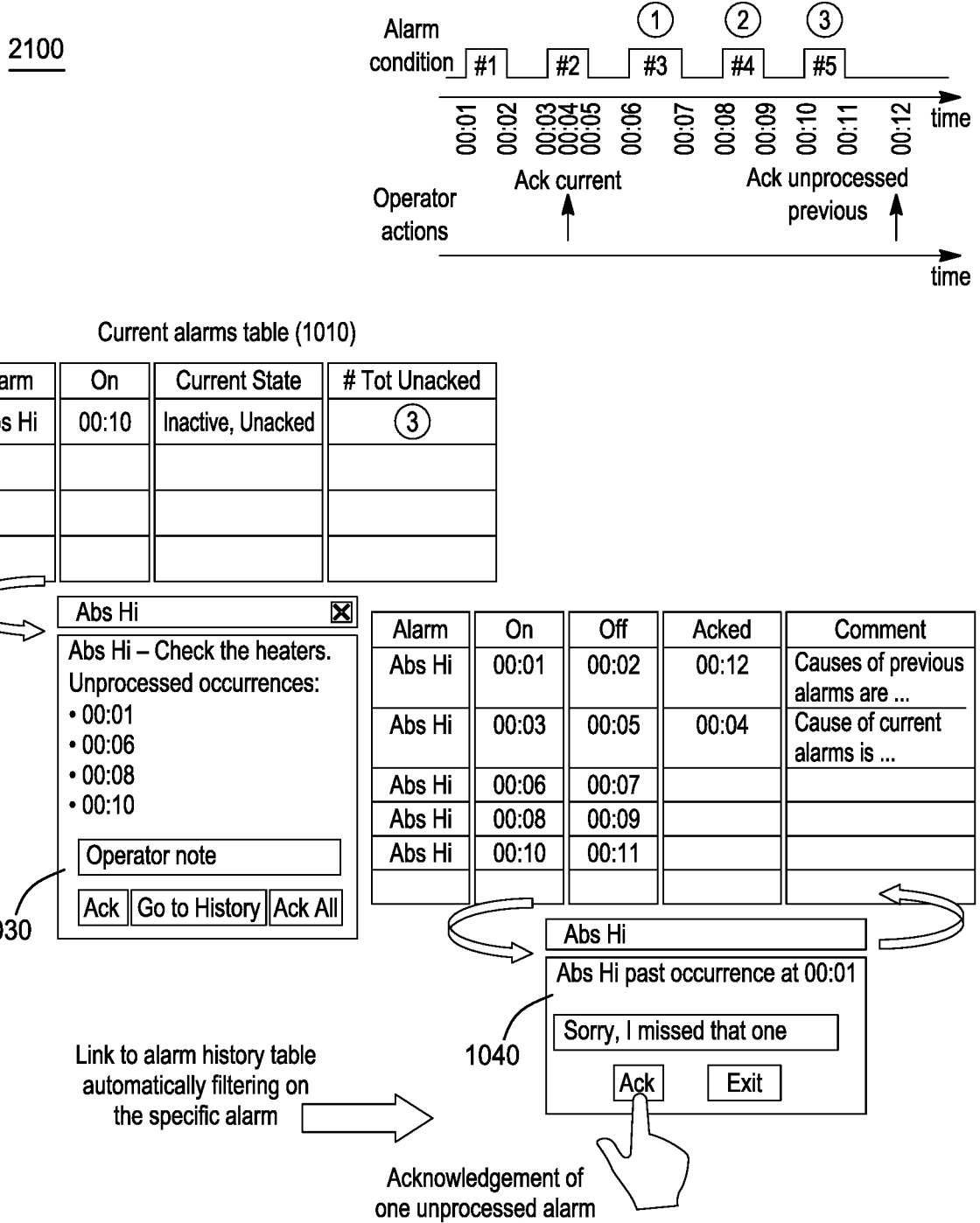

Next, as shown in FIG. 23, the operator can select the alarm information for a desired occurrence, in this case occurrence #1 (00:01), on the alarm history table 1020, which results in the presentation of a graphical window 1040 identifying information for the selected occurrence #1 (00:001), e.g., Abs Hi past occurrence at 00:001. The graphical window 1040 also provides graphical inputs for receiving user input, such as a text box for the operator to enter comments/notes, an Acknowledgement (Ack) button to acknowledge the selected unacknowledged/unprocessed occurrence of the alarm, and an exit button to exit the window 1040.

As further shown in FIG. 23, the operator inputs comments in the text box (e.g., Sorry, I missed that one) and selects the Ack button to acknowledge the selected unacknowledged prior occurrence of the alarm, e.g., #1. The selected occurrence of the alarm is acknowledged at time 00:12 as shown on the operator actions graph. Thereafter, the information for the selected unacknowledged prior occurrence of the alarm, e.g., #1, is updated to reflect the acknowledgement action and the time of acknowledgement (e.g., 00:12) and the user comments. Furthermore, the current alarms table 1010 also is updated to update the total number of unacknowledged occurrences to three (3).

The above examples are described so far with reference to one type of alarm (e.g., Abs Hi); however, it should be understood that the alarm management system and method as described herein can be used to manage a plurality of different types of alarms (including the acknowledgement of their occurrences) together or separately.

Figure 25:
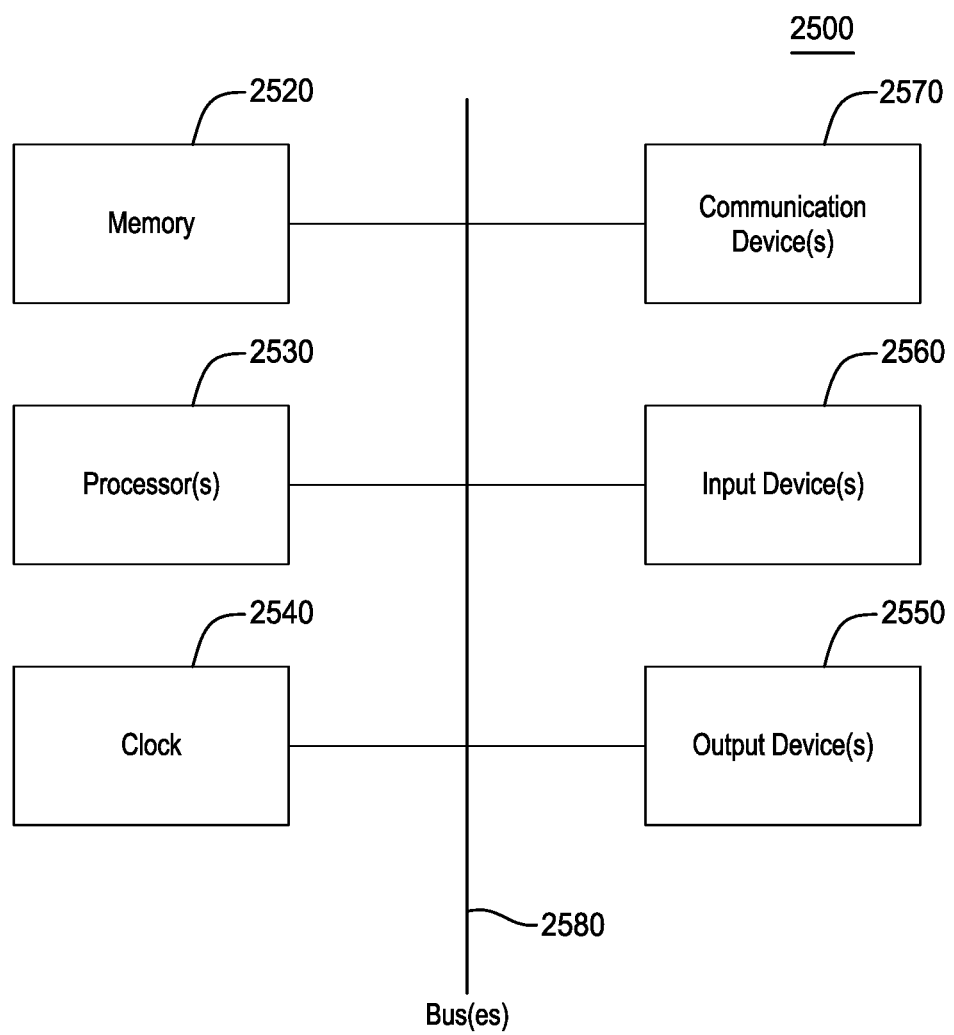
FIG. 25 illustrates example components of a computer device (or system), in accordance with an embodiment of the present disclosure.

FIG. 25 is a block diagram of example components of a computer device (or system) 2500, in accordance with an exemplary embodiment of the present disclosure. As shown in FIG. 25, a computer device 2500 can include for example memory 2520, processor(s) 2530, clock 2540, output device 2550, input device 2560, communication device 2570, and a bus system 2580 between the components of the computer device. The clock 2540 can be used to time-stamp data or an event with a time value, and synchronize operations within the device and with remote devices or a system. The communication device 2570 can include transmitters and receivers for conducting wireless communications or wireline communications across, for example, electrical wires (e.g., conductors) and/or fiber optic cables.

The memory 2520 can store computer executable code, programs, software or instructions, which when executed by a processor(s), controls the operations of the computer device 2500, including the various processes described herein. The memory 2520 can also store other data used by the computer device 2500 or components thereof to perform the operations described herein. The other data can include but is not limited to process data including process value(s); alarm criteria such as alarm conditions, parameters or thresholds; alarm data or information related thereto, and acknowledgement data or information related thereto; and other data described herein.

The output device(s) 2550 can include a display device, printing device, speaker, lights (e.g., LEDs) and so forth. For example, the output device(s) 2550 may output for display or present information regarding the process under control and information associated therewith including process data, alarm occurrences, graphical user interfaces (GUIs) or other data.

The input device(s) 2560 can include any user input device such as a mouse, trackball, microphone, touch screen, a joystick, control console, keyboard/pad, touch screen or other device operable by a user.

The processor(s) 2530, which interacts with the other components of the computer device, is configured to control or implement the various operations and functions described herein.

The above describes example components of a computer device. The computer device may or may not include all of the components of FIG. 25, and may include other additional components to facilitate operation of the processes and features described herein. The computer device may be a distributed processing system, which includes a plurality of computer devices which can operate to perform the various processes and features described herein.

It should be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s) or controller(s) as described herein can be a processing system, which can include one or more processors, such as CPU, controller, application specific integrated circuit (ASIC), field programmable gate array (FPGA) or other processing unit or circuitry (or a combination thereof), which controls or performs the operations of the devices or systems, described herein. The processor(s) or controller(s) can communicate with memory/storage devices, which can store computer program(s) or application(s) (e.g., software, firmware, etc.), control or other parameter(s) and/or any other data for use in implementing the method and system described herein. Memory/storage devices can include, but are not limited to, disks, solid state drives, optical disks, removable memory devices such as smart cards, SIMS, WIMs, semiconductor memories such as RAM, ROM, PROMS, etc. Transmitting mediums or networks include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A method for managing an alarm, comprising:
    capturing in real-time each new occurrence of the alarm for a monitored process, the alarm being active or inactive based on an alarm criteria and at least process data, including one or more process values, of the monitored process, each new occurrence of the alarm superseding a prior occurrence of the alarm as a current occurrence of the alarm;
    tracking occurrences of the alarm including whether the occurrences, including the current occurrence of the alarm and at least one prior occurrence of the alarm, have been acknowledged by a user;
    recording alarm information for the occurrences of the alarm in a memory, the alarm information including each occurrence of the alarm and information associated therewith including a timestamp of the occurrence and whether the occurrence of the alarm is acknowledged or not by the user;
presenting or enabling presentation of one or more unacknowledged occurrences, from the tracked occurrences of the alarm, for acknowledgement by the user, the one or more unacknowledged occurrences including the at least one prior occurrence of the alarm; and
in response to the acknowledgement of the at least one prior occurrence of the alarm, updating the recorded alarm information to reflect the acknowledgement of the at least one prior occurrence of the alarm.

2. The method of claim 1, wherein the information related to each new occurrence of the alarm is provided to a user device to enable the presentation of the current occurrence of the alarm and/or the at least one prior occurrence of the alarm for acknowledgement by the user.

3. The method of claim 1, wherein the presenting or the enabling presentation operation comprises:
presenting or enabling presentation of the current occurrence of the alarm for acknowledgement by the user, wherein, when a new occurrence of the alarm occurs, the new occurrence of the alarm becomes the current occurrence of the alarm; and
in response to the acknowledgement of the current occurrence of the alarm, updating the recorded alarm information to reflect the acknowledgement of the current occurrence of the alarm.

4. The method of claim 1, wherein the presenting or the enabling presentation operation comprises:
presenting or enabling presentation of the information for the current occurrence of the alarm and a total number of unacknowledged occurrences of the alarm; and
in response to a user input, presenting or enabling presentation of the one or more unacknowledged occurrences of the alarm on a graphical user interface with a first graphical window for enabling the user to selectively acknowledge the presented one or more unacknowledged occurrences.

5. The method of claim 4, wherein the graphical user interface is configured to receive comments from the user, the recorded alarm information being updated with the comments.

6. The method of claim 4, wherein the alarm information is recorded in an alarm history table, and the graphical user interface includes a graphical input for linking to the alarm history table to present a filtered view of the occurrences on the alarm history table on a second graphical window through which to selectively acknowledge an unacknowledged occurrence of the alarm from the occurrences of the alarm recorded on the alarm history table.

7. The method of claim 1, wherein the tracking occurrences of the alarm comprises tracking in real-time a first number of unacknowledged prior occurrences of the alarm or a second number of a total number of unacknowledged occurrences.

8. The method of claim 1, further comprising:
receiving the process data in real-time;
activating or de-activating the alarm in real-time based on the alarm criteria and the received process data; and
recording the process data along with or in association with the alarm information.

9. The method of claim 1, wherein the presentation or acknowledgement of the unacknowledged prior occurrences is constrained by a time or quantity constraint.

10. The method of claim 1, further comprising:
performing statistical analysis for the occurrences of the alarm over a course of the monitored process; and
recording statistical information from the statistical analysis for the occurrences of the alarm in the memory.

11. The method of claim 1, wherein the capturing operation, the tracking operation, the recording operation, the presenting or enabling presentation operation, and the updating operation are performed for a plurality of different alarms.

12. The method of claim 1, wherein at least the capturing operation, the tracking operation, the recording operation, and the updating operation are performed by a process data recorder/controller responsible for capturing and storing the process data in real-time.

13. An alarm management system, comprising:
a memory for storing data,
a communication device, and
a processor configured to:
capture in real-time each new occurrence of an alarm for a monitored process, the alarm being active or inactive based on an alarm criteria and at least process data, including one or more process values, of the monitored process, each new occurrence of the alarm superseding a prior occurrence of the alarm as a current occurrence of the alarm;
track occurrences of the alarm including whether the occurrences, including the current occurrence of the alarm and at least one prior occurrence of the alarm, have been acknowledged by a user;
record alarm information for the occurrences of the alarm in the memory, the alarm information including each occurrence of the alarm and information associated therewith including a timestamp of the occurrence and whether the occurrence of the alarm is acknowledged or not by the user;
present or enable presentation of one or more unacknowledged occurrences, from the tracked occurrences of the alarm, for acknowledgement by the user, the one or more unacknowledged occurrences including the at least one prior occurrence of the alarm; and
in response to the acknowledgement of the at least one prior occurrence of the alarm, update the recorded alarm information to reflect the acknowledgement of the at least one prior occurrence of the alarm.

14. The alarm management system of claim 1, comprising:
a process data recorder/controller including the memory, the communication device and the processor.

15. The alarm management system of claim 13, wherein the processor is further configured to:
perform statistical analysis for the occurrences of the alarm over a course of the monitored process; and
record statistical information from the statistical analysis for the occurrences of the alarm in the memory.

16. The alarm management system of claim 15, wherein the information related to each new occurrence of the alarm is provided to a user device to enable the presentation of the current occurrence of the alarm and/or the at least one prior occurrence of the alarm for acknowledgement by the user.

17. The alarm management system of claim 15, wherein, to present or enable the presentation, the processor is configured to:
present or enable the presentation of the current occurrence of the alarm for acknowledgement by the user, wherein, when a new occurrence of the alarm occurs, the new occurrence of the alarm becomes the current occurrence of the alarm; and in response to the acknowledgement of the current occurrence of the alarm, update the recorded alarm information to reflect the acknowledgement of the current occurrence of the alarm.

18. The alarm management system of claim 15, wherein to present or enable the presentation, the processor is configured to:
  present or enable the presentation of the information for the current occurrence of the alarm and a total number of unacknowledged occurrences of the alarm; and
  in response to a user input, present or enable the presentation of the one or more unacknowledged occurrences of the alarm on a graphical user interface with a first graphical window for enabling the user to selectively acknowledge the presented one or more unacknowledged occurrences.

19. The alarm management system of claim 18, wherein the graphical user interface is configured to receive comments from the user, the recorded alarm information being updated with the comments.

20. The alarm management system of claim 18, wherein the alarm information is recorded in an alarm history table, and the graphical user interface includes a graphical input for linking to the alarm history table to present a filtered view of the occurrences on the alarm history table on a second graphical window through which to selectively acknowledge an unacknowledged occurrence of the alarm from the occurrences of the alarm recorded on the alarm history table.

21. The alarm management system of claim 15, wherein, to track the occurrences of the alarm, the processor is configured to track in real-time a first number of unacknowledged prior occurrences of the alarm or a second number of a total number of unacknowledged occurrences.

22. The alarm management system of claim 15, wherein the processor is further configured to:
  receive the process data in real-time;
  activate or de-activating the alarm in real-time based on the alarm criteria and the received process data; and
  record the process data along with or in association with the alarm information.

23. The alarm management system of claim 15, wherein the presentation or the acknowledgement of the unacknowledged prior occurrences is constrained by a time or quantity constraint.

24. The alarm management system of claim 15, wherein the capturing operation, the tracking operation, the recording operation, the presenting or enabling presentation operation, and the updating operation are performed for a plurality of different alarms.

25. A non-transitory computer medium storing computer executable code, which when executed by one or more processors, is configured to implement a method of managing an alarm, the method comprising: capturing in real-time each new occurrence of the alarm for a monitored process, the alarm being active or inactive based on an alarm criteria and at least process data, including one or more process values, of the monitored process, each new occurrence of the alarm superseding a prior occurrence of the alarm as a current occurrence of the alarm; tracking occurrences of the alarm including whether the occurrences, including the current occurrence of the alarm and at least one prior occurrence of the alarm, have been acknowledged by a user; recording alarm information for the occurrences of the alarm in a memory, the alarm information including each occurrence of the alarm and information associated therewith including a timestamp of the occurrence and whether the occurrence of the alarm is acknowledged or not by the user; presenting or enabling presentation of one or more unacknowledged occurrences, from the tracked occurrences of the alarm, for acknowledgement by the user, the one or more unacknowledged occurrences including the at least one prior occurrence of the alarm; and in response to the acknowledgement of the at least one prior occurrence of the alarm, updating the recorded alarm information to reflect the acknowledgement of the at least one prior occurrence of the alarm.

* * * * *